(12) United States Patent
Hayashi et al.

(10) Patent No.: US 6,694,040 B2
(45) Date of Patent: *Feb. 17, 2004

(54) DATA PROCESSING APPARATUS AND METHOD, AND MEMORY MEDIUM

(75) Inventors: Junichi Hayashi, Kawasaki (JP); Keiichi Iwamura, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/361,806

(22) Filed: Jul. 27, 1999

(65) Prior Publication Data

US 2003/0161496 A1 Aug. 28, 2003

(30) Foreign Application Priority Data

| Jul. 28, 1998 | (JP) | ............................................. | 10-212437 |
| Sep. 30, 1998 | (JP) | ............................................. | 10-278629 |
| Dec. 25, 1998 | (JP) | ............................................. | 10-370529 |

(51) Int. Cl.$^7$ ................................................ G06K 9/00
(52) U.S. Cl. ..................................................... 382/100
(58) Field of Search ................................ 382/100, 232, 382/276; 713/168, 170, 176, 177, 179, 180; 380/200, 210, 214, 216, 287, 51; 348/460; 399/366

(56) References Cited

U.S. PATENT DOCUMENTS

| 5,889,868 A | * | 3/1999 | Moskowitz et al. | ........ 713/176 |
| 5,915,027 A | * | 6/1999 | Cox et al. | ...................... 380/54 |
| 6,185,312 B1 | * | 2/2001 | Nakamura et al. | ........... 382/100 |
| 6,208,735 B1 | * | 3/2001 | Cox et al. | ...................... 380/54 |
| 6,226,387 B1 | * | 5/2001 | Tewfik et al. | ................ 382/100 |
| 6,240,121 B1 | * | 5/2001 | Senoh | ......................... 375/130 |
| 6,332,030 B1 | * | 12/2001 | Manjunath et al. | .......... 382/100 |
| 6,359,998 B1 | * | 3/2002 | Cooklev | ...................... 382/100 |

OTHER PUBLICATIONS

W. Bender, et al., "Techniques for Data Hiding", The International Society for Optical Engineering, vol. 2420, Feb. 1999, pp. 164–173.
H. Imai, "Recent Development of Cryptology in Japan", The Transactions of the IEICE, vol. E73, No. 7, Jul. 1990, pp. 1026–1030.
T. Matsumoto, "A Prototype KPS and Its Application—IC Card Based Key Sharing and Cryptographic Communication", The Transactions of the IEICE, vol. E73, No. 7, Jul. 1990, pp. 1111–1119.
Y. Zheng, "Connection Among Several Versions of One––Way Hash Functions", The Transactions of the IEICE, vol. 73, No. 7, Jul. 1990, pp. 1092–1099.
Nakamura, Ogawa, Takashima, "Method of Watermarking Under Frequency Domain for Protecting Copyright of Digital Image", SCIS '97–26A, Jan. 1997.
Onishi, Oka, Matsui, "Watermarking Scheme to Image by PN Sequence", SCIS '97–26B, Jan. 1997.
Ishizuka, Sakai, Sakurai, "On an Experimental Evaluation of Steganography with Wavelet Transform", SCIS '97–26DP, Jan. 1997.
Inoue, Miyazaki, Yamamoto, Katsura, "A Digital Watermark Technique Based on the Wavelet Transform and its Robustness on Image Compression and Transformation", SCIS '98–3.2A, Jan. 1998.

* cited by examiner

Primary Examiner—Andrew W. Johns
Assistant Examiner—Shervin Nakhjavan
(74) Attorney, Agent, or Firm—Fitzpatrick, Cella, Harper & Scinto

(57) ABSTRACT

This invention has as its object to provide a technique for embedding digital-watermark information in image data while minimizing deterioration of the original image quality. To this end, a data processing apparatus of this invention has input means for inputting image data consisting of a plurality of coefficients, and embedding means for embedding digital-watermark information in coefficients having values falling within a predetermined range of the input image data.

8 Claims, 23 Drawing Sheets

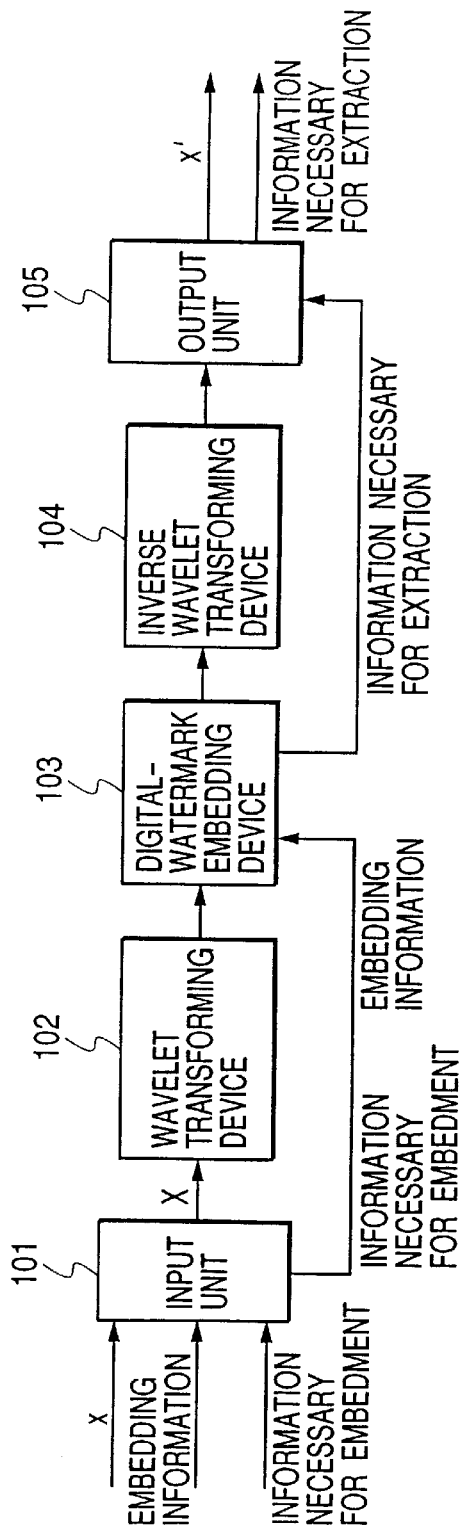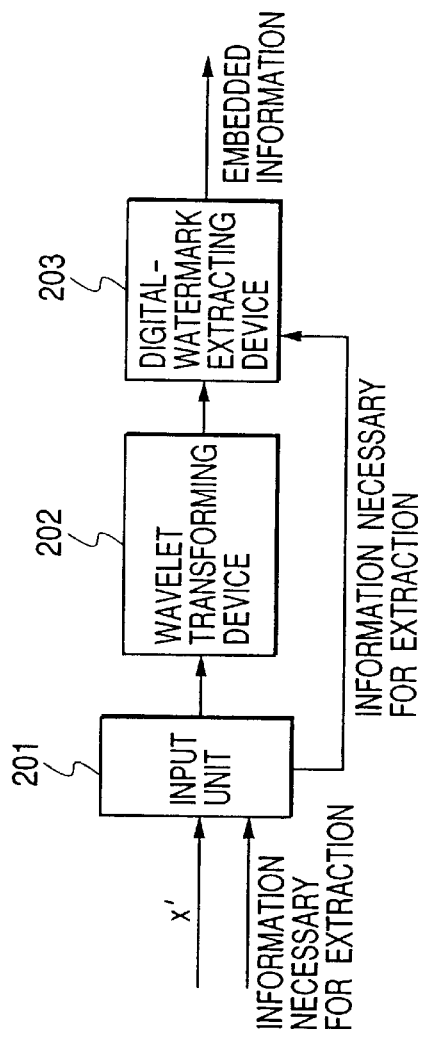

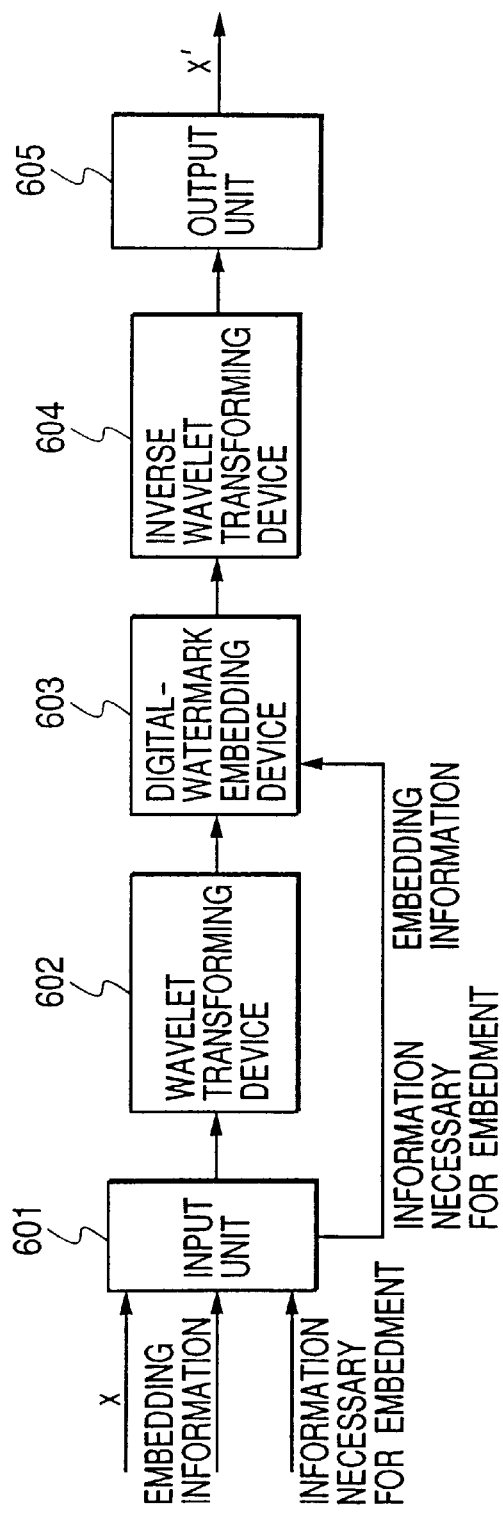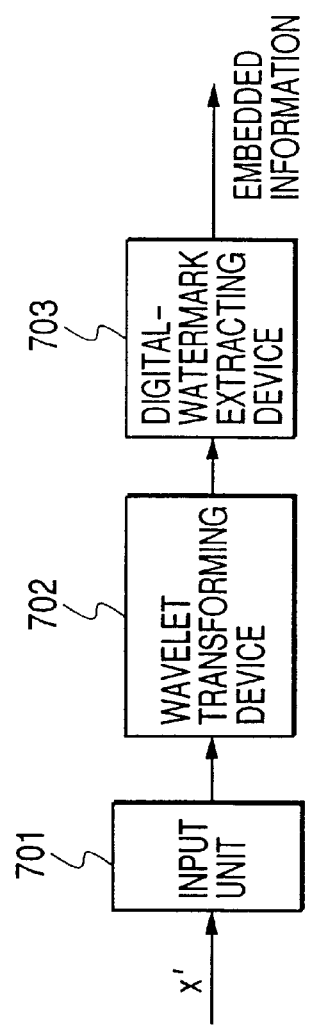

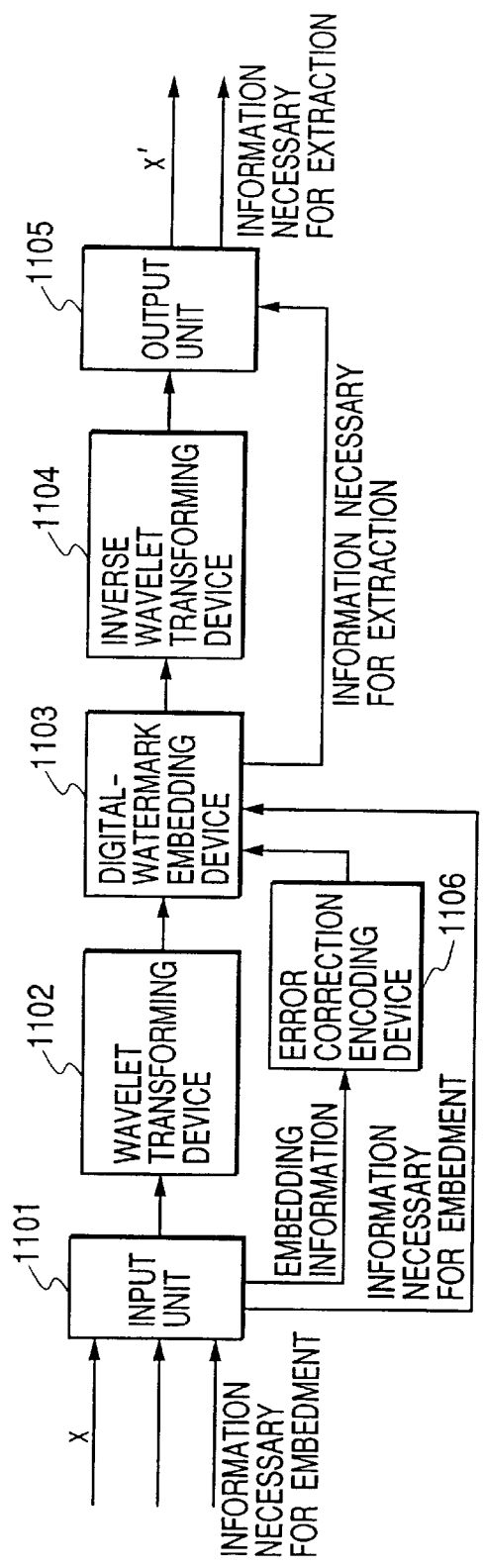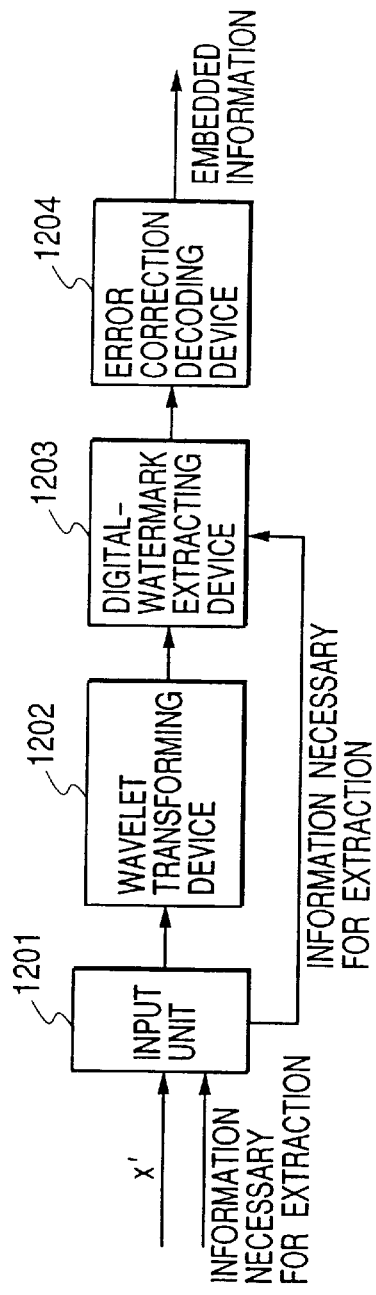

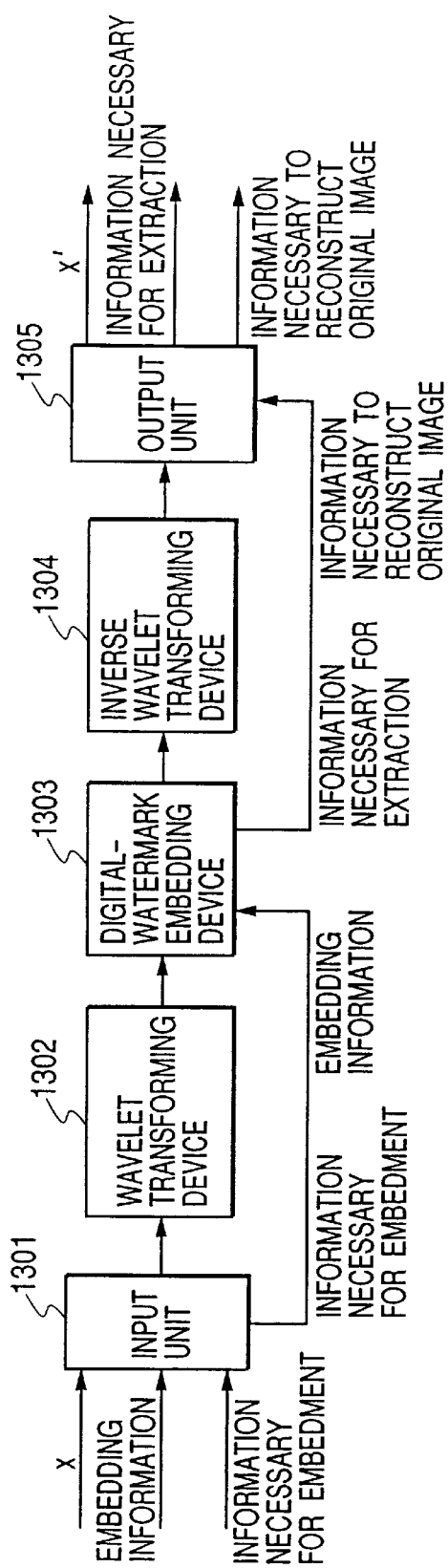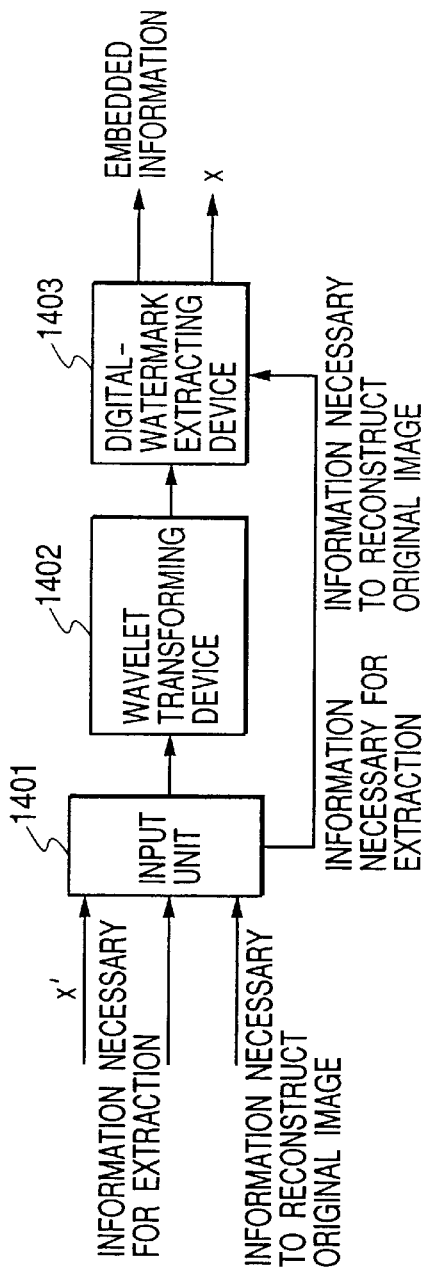

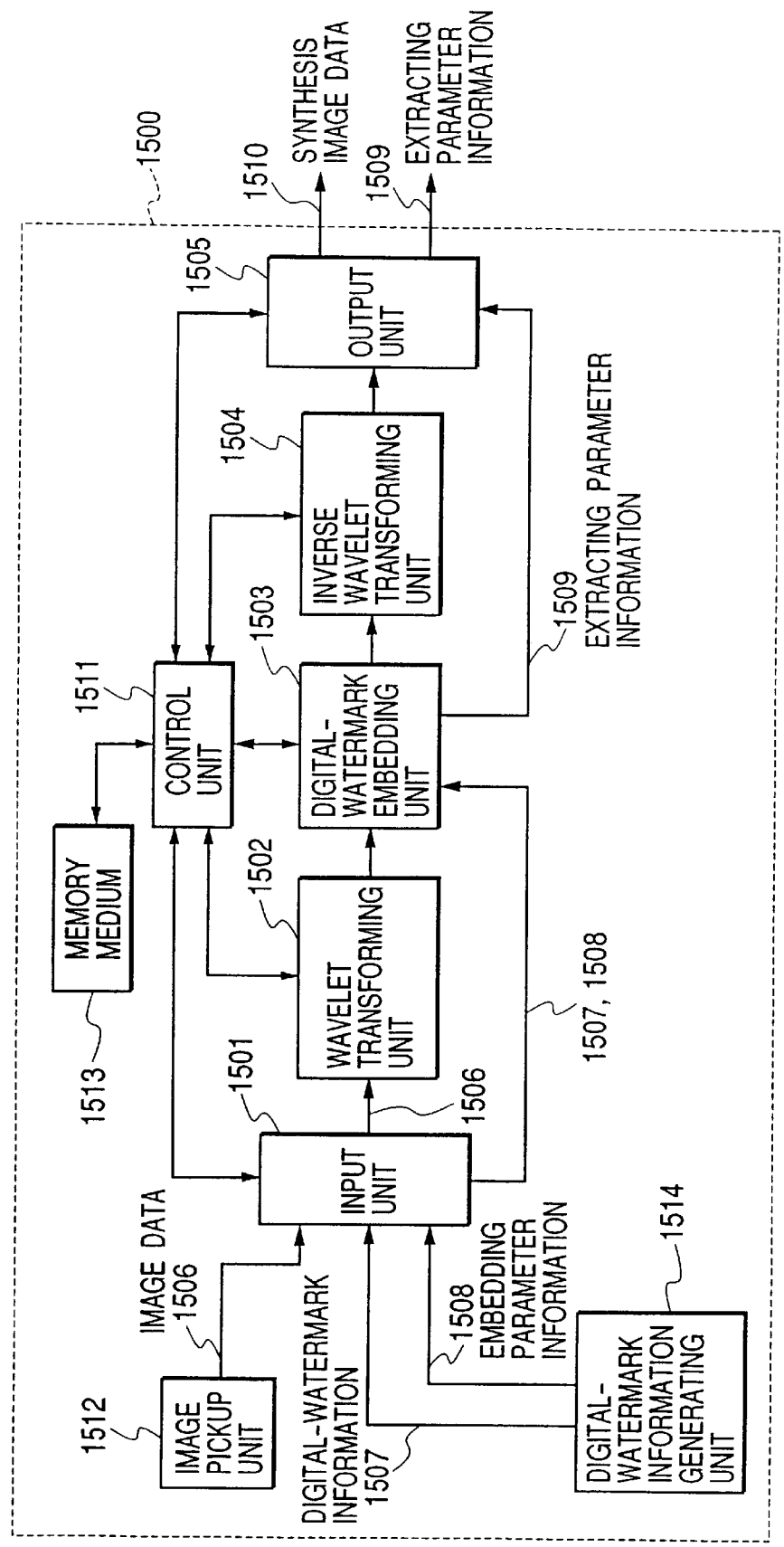

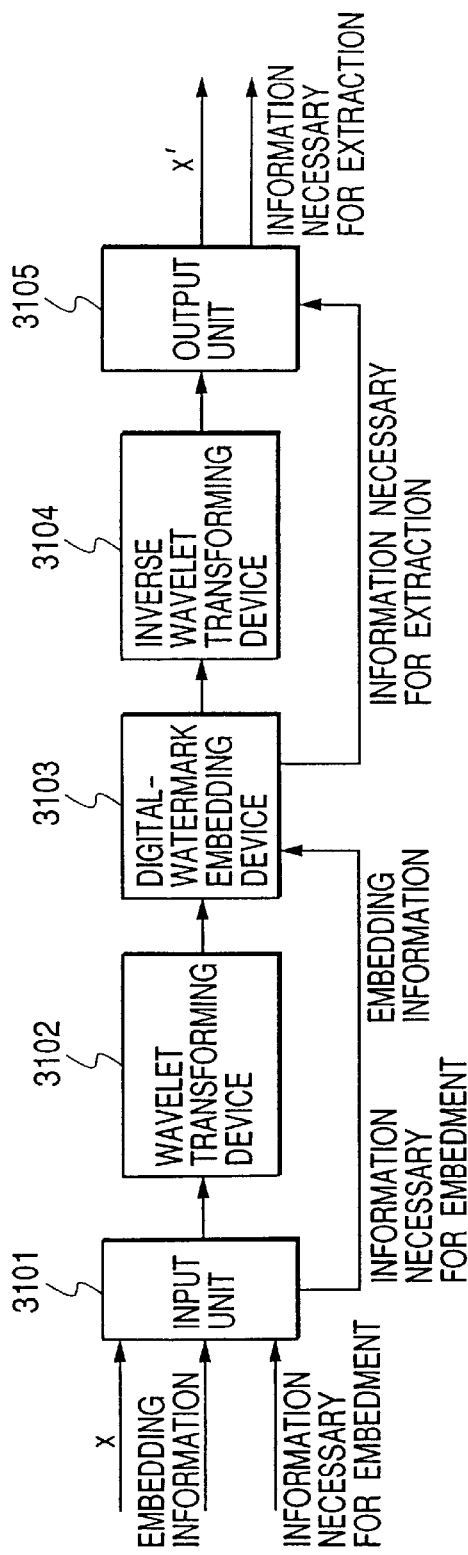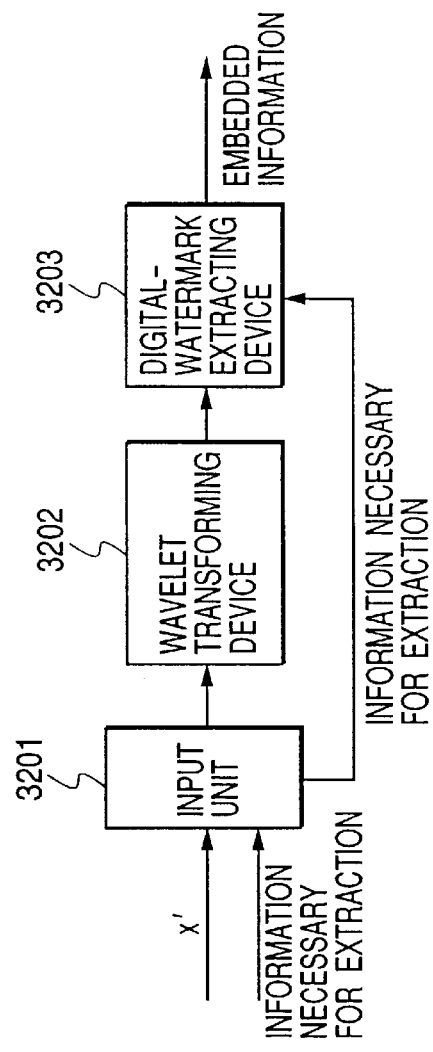

DATA PROCESSING APPARATUS AND METHOD, AND MEMORY MEDIUM

BACKGROUND OF THE INVENTION

1. Field of the Invention

The present invention relates to a technique for embedding digital-watermark information in image data.

2. Related Background Art

In recent years, computers and networks have advanced remarkably, and various kinds of data such as character data, image data, audio data, and the like are handled in computers and networks. Since such data are digital data, copies of data with equivalent quality can be readily created in the current environment.

For this reason, in order to prevent illicit copies and interpolation of data, and protect the copyright, copyright information and user information is embedded in image data, audio data, or the like as digital-watermark information. This is a technique for secretly embedding information in data by performing predetermined processing of this data.

Hence, since the copyright information or user information can be obtained by extracting the digital-watermark information from data, an illicit copy can be tracked.

As a method of embedding digital-watermark information, there are two methods, i.e., a method of embedding information in the space domain, and a method of embedding information in the frequency domain.

As an example of the method of embedding information in the space domain, a scheme of IBM (W. Bender, D. Gruhl, and N. Morimoto, "Techniques for Data Hiding", Proceeding of the SPIE, San Jose Calif., USA, February 1955) and the like are known as one based on patchwork.

On the other hand, as an example of the method of embedding information in the frequency domain, a scheme of NTT (Nakamura, Ogawa, and Takashima, "Method of Watermarking under Frequency Domain for Protecting Copyright of Digital Image", SCIS '97-26A, January 1997) is known as one using the discrete cosine transform. On the other hand, a scheme of National Defense Academy of Japan (Onishi, Oka, and Matsui, "Watermarking Scheme to Image by PN Sequence", SCIS '97-26B, January 1997) is known as one using the discrete Fourier transform. Furthermore, a scheme of Mitsubishi and Kyushu University (Ishizuka, Sakai, and Sakurai, "On Experimental Evaluation of Steganography with Wavelet Transform", SCIS '97-26DP, January 1997), and a scheme of Matsushita (Inoue, Miyazaki, Yamamoto, and Katsura, "Digital Watermark Technique Based on Wavelet Transform and its Robustness on Image Compression and Transformation", SCIS '98-3.2.A, January 1998) are known as techniques using the discrete wavelet transform.

Note that requirements for the digital-watermark technique include:

(1) no visible image quality deterioration of original image;

(2) superior robustness against attacks; and (3) large size of information that can be embedded.

Attacks will be briefly explained below.

Attacks are acts of deleting or destroying watermark information, and there are two types of attacks. One type is deliberate attacks, which include an attack of appending noise to image data embedded with watermark information, an attack of deleting an area where watermark information is likely to be embedded, and the like. The other type is attacks by means of image processes, such as image compression, enlargement and reduction, cut-out, gradation conversion, print-out, scanning, and the like for image data embedded with digital-watermark information. Hence, watermark information embedded in image data must be robust against any of these attacks.

The purposes of embedding digital-watermark information in digital contents such as image data and the like are to protect the copyright of digital contents, and to detect interpolation of digital contents. In case of the former purpose, digital-watermark information which is highly robust against attacks is preferably embedded in digital contents. In case of the latter purpose, digital-watermark information which is less robust against attacks is preferably embedded in digital contents.

Conventionally, when digital-watermark information which is highly robust against attacks is embedded in an image, the image quality visually deteriorates compared to an original image.

When an image embedded with digital-watermark information has been attacked, it is hard to reliably extract the digital-watermark information.

SUMMARY OF THE INVENTION

The present invention has been made to solve the above problems, and has as its object to provide a technique for embedding digital-watermark information in image data while minimizing deterioration of original image quality.

In order to achieve the above object, according to a preferred embodiment of the present invention, there is provided a data processing apparatus comprising:

an input unit for inputting image data composed of a plurality of coefficients; and an embedding unit for embedding digital-watermark information in a coefficient having a value within a predetermined range of the input image data.

Also, there is provided a data processing apparatus comprising:

an input unit for inputting image data composed of a plurality of coefficients; and an embedding unit for detecting a coefficient having a maximum absolute value of the input image data, and embedding digital-watermark information in the detected coefficient.

Furthermore, there is provided a data processing apparatus comprising:

an input unit for inputting image data composed of a plurality of coefficients; and an embedding unit for embedding digital-watermark information at a first strength in a coefficient having a value within a first range, and embedding digital-watermark information at a second strength in a coefficient having a value within a second range.

Other objects and features of the present invention will become apparent from the following description of the embodiments taken in conjunction with the accompanying drawings.

BRIEF DESCRIPTION OF THE DRAWINGS

FIG. 1 is a block diagram showing a digital-watermark information embedding apparatus according to the first embodiment of the present invention;

FIG. 2 is a block diagram showing a digital-watermark information extracting apparatus according to the first embodiment of the present invention;

FIG. 6 is a block diagram showing a digital-watermark information embedding apparatus according to the second embodiment of the present invention;

FIG. 7 is a block diagram showing a digital-watermark information extracting apparatus according to the second embodiment of the present invention;

FIG. 11 is a block diagram showing a digital-watermark information embedding apparatus according to the fifth embodiment of the present invention;

FIG. 12 is a block diagram showing a digital-watermark information extracting apparatus according to the fifth embodiment of the present invention;

FIG. 13 is a block diagram showing a digital-watermark information embedding apparatus according to the sixth embodiment of the present invention;

FIG. 14 is a block diagram showing a digital-watermark information extracting apparatus according to the sixth embodiment of the present invention;

FIG. 15 is a block diagram showing the arrangement of a data processing apparatus 1500 according to the seventh embodiment of the present invention;

FIG. 25 is a block diagram showing a digital-watermark information embedding apparatus according to the ninth embodiment of the present invention;

FIG. 26 is a block diagram showing a digital-watermark information extracting apparatus according to the ninth embodiment of the present invention;

DESCRIPTION OF THE PREFERRED EMBODIMENTS

Figure 3:
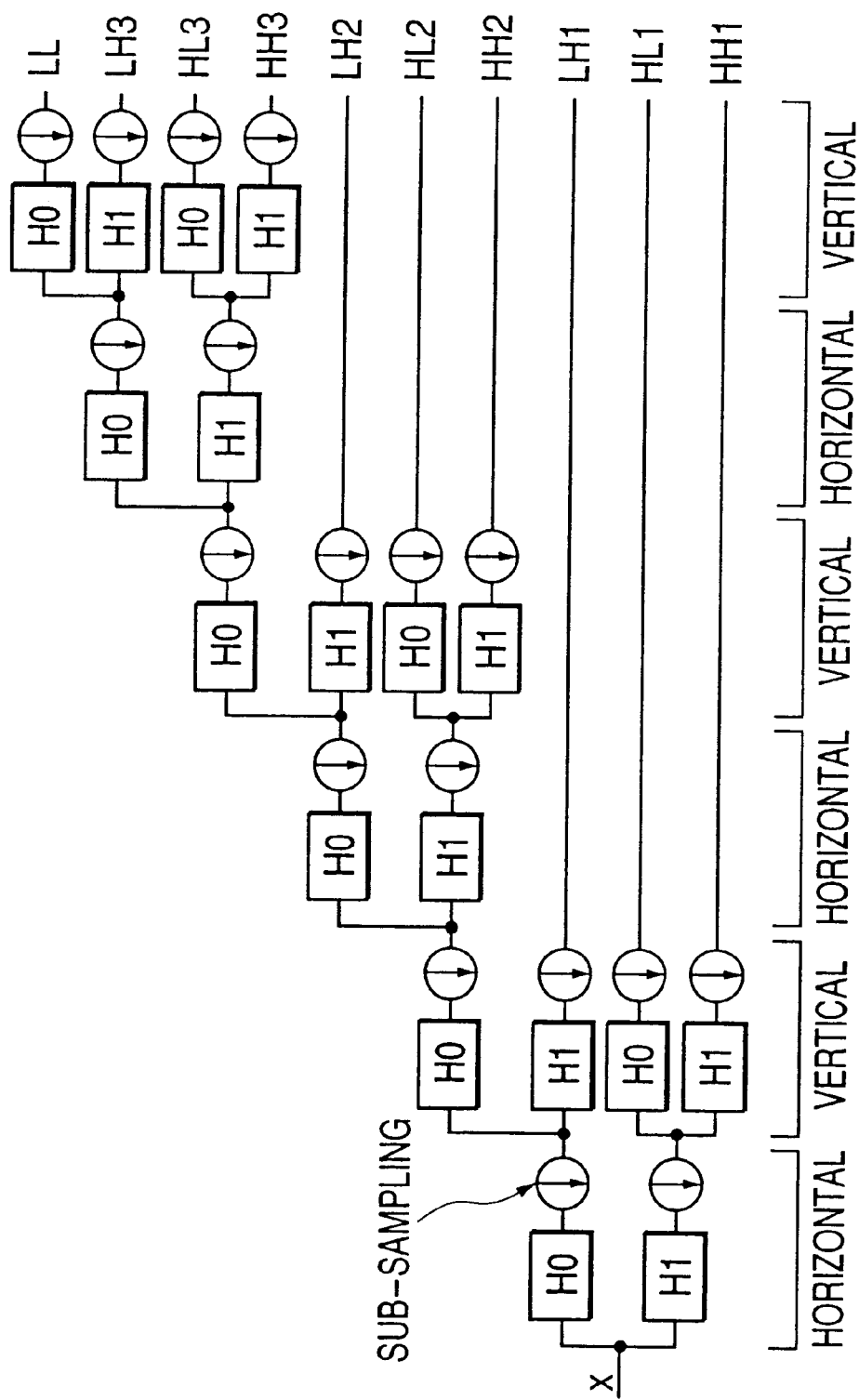
FIG. 3 is a circuit diagram showing the arrangement of a wavelet transforming device.

The preferred embodiments of the present invention will be described in turn hereinafter.

(First Embodiment)

The first embodiment of the present invention will be explained first.

FIG. 1 shows an embodiment of an embedding apparatus for embedding digital-watermark information in an image processing apparatus according to the present invention.

Referring to FIG. 1, an input unit 101 receives multi value image data (x) having a predetermined number of bits per pixel, digital-watermark information to be embedded, and parameters necessary for embedding. Of these inputs, the multi value image data (x) is sent to a wavelet transforming device 102, and the digital-watermark information and parameters are sent to a digital-watermark embedding device 103.

The multi value image data input to the wavelet transforming device 102 undergoes a predetermined transform. The wavelet transforming device 102 outputs frequency-transformed coefficients, which are sent to the digital-watermark embedding device 103. The wavelet transforming device 102 and digital-watermark embedding device 103 will be described in detail later.

The digital-watermark embedding device 103 outputs a data sequence that represents a synthesis image embedded with the digital-watermark information, and information required for extracting the digital-watermark information from the synthesis image.

The output from the digital-watermark embedding device 103 is input to an inverse wavelet transforming device 104. The inverse wavelet transforming device 104 will be explained in detail later.

The output from the inverse wavelet transforming device 104 and the information required for extracting the digital-watermark information are sent to an output unit 105. The output unit 105 outputs these two kinds of information.

The respective devices will be explained in detail below.

The wavelet transforming device 102 will be described first.

The wavelet transforming device 102 divides the input multi value image data into a plurality of different frequency bands (each band will be referred to as a sub-band hereinafter) by the wavelet transform.

Figure 4:
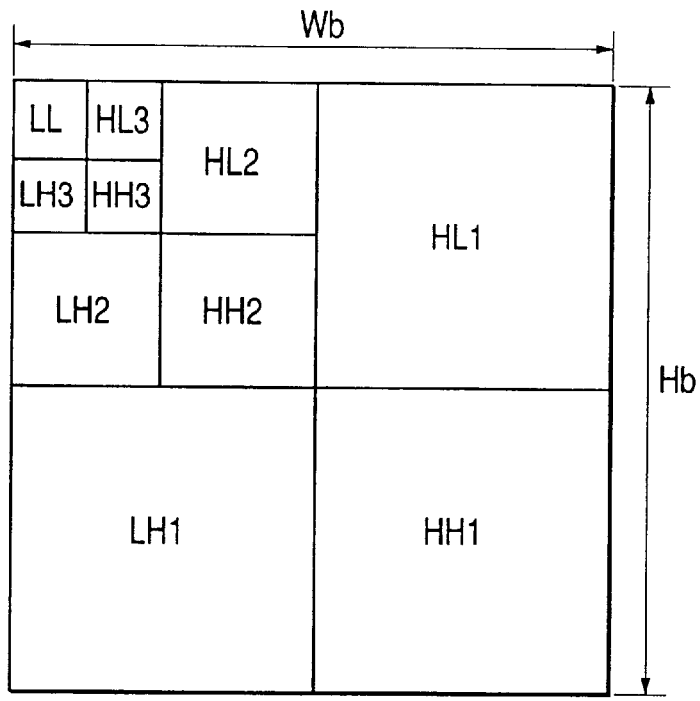
FIG. 4 is a view showing the concept of sub-bands generated by the wavelet transform.

FIG. 3 shows the execution procedure of the wavelet transform, and FIG. 4 shows the concept of sub-bands generated by this transform.

The multi value image data input in FIG. 1 passes through one or both of low-pass filters H0 and high-pass filters H1 in the horizontal and vertical directions, as shown in FIG. 3, and undergoes sub-sampling every time the data passes through the filter. As a result, the image data is divided into a plurality of frequency bands.

FIG. 4 shows the result obtained by transforming multi value image data having Wb pixels (horizontal)×Hb pixels (vertical) in three steps in each of the horizontal and vertical directions.

The size of each block shown in FIG. 4 corresponds to the size (Wb×Hb) of an image divided by a block divider. For example, filtering using the filters H0 and sub-sampling with respect to the multi value image data (x) yields:

$$r(n)=<<[x(2n)+x(2n+1)]/2>> \quad (1)$$

and filtering using the filters H1 and sub-sampling yields:

$$d(n)=x(2n+1)-x(2n+3)+<<[-r(n)+r(n+2)2]/4>> \quad (2)$$

where $<<x>>$ is a maximum integer which does not exceed x.

The wavelet transforming device 102 breaks up each input block image into a plurality of sub-bands by sequentially repeating filtering and sub-sampling in the horizontal and vertical directions, as shown in FIG. 3.

FIG. 4 shows the relationship between the names and spatial positions of sub-bands obtained by the processes shown in FIG. 3. Each sub-band includes a corresponding transform coefficient (frequency component).

The digital-watermark embedding device 103 will be explained below.

As is generally known, a natural image such as a photograph has a huge number of large signals in a minimum area sub-band in the wavelet transform domain, and has only small signals in local portions such as edge portions, texture regions, and the like of an image in sub-bands other than the minimum area sub-band.

Furthermore, human vision is such that "it is hard for us to perceive a small change in a portion with a large change in the space domain".

By exploiting this fact, digital-watermark information is embedded in the wavelet transform domain.

This embedding process exploits the fact that "a portion with a large change in the space domain" corresponds to "a portion with a large absolute value of a coefficient in the wavelet transform domain".

More specifically, in this embodiment, digital-watermark information is embedded in coefficients having absolute values larger than a predetermined value of those included in sub-bands other than the minimum area sub-band in the wavelet transform domain. As a result, the digital-watermark information becomes hard to detect by the human eye.

By utilizing the above facts, this embodiment pays attention to the tree structure in the wavelet transform domain, and embeds 1-bit information in each tree in turn. Note that the tree is a set of coefficients located at identical spatial positions in the wavelet transform domain (a plurality of sub-bands).

Figure 5:
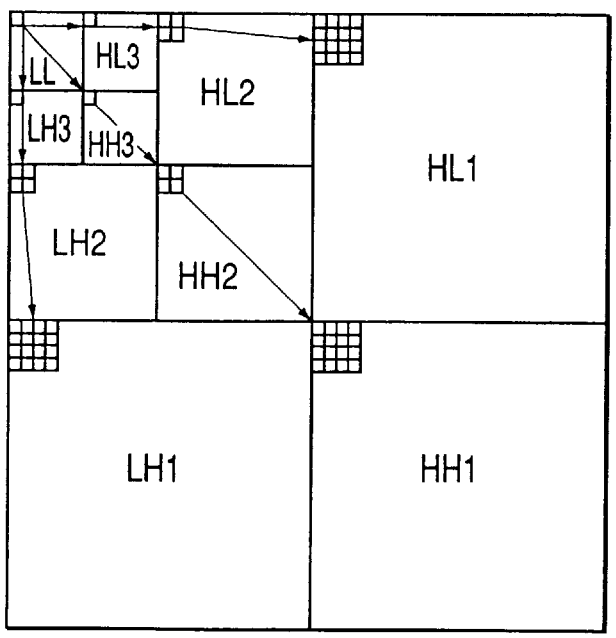
FIG. 5 is a view for explaining trees in the wavelet transform domain.

FIG. 5 shows an example of the tree structure in the wavelet transform domain.

Of coefficients included in the tree except for a coefficient included in the minimum area sub-band, i.e., in LL3 in FIG. 4, a coefficient having the n_i-th largest absolute value is selected as an embedding object of the digital-watermark information. Note that n_i is a natural number generated by, e.g., a random number generator, and i is the serial number assigned to the tree.

The information embedded by selecting such coefficient is relatively hard to perceive by the human eye.

The selected coefficient may, for example, be embedded with watermark information by quantization. Note that quantization is to round a continuous value or discrete value to a discrete value or a discrete value with a different width. The rounded discrete value is called a quantizing representative value, and the width, i.e., the interval between neighboring quantizing representative values is called a quantizing step. The quantizing step size corresponds to the embedding strength.

For example, 1 bit "0" or "1" that constructs digital-watermark information is embedded according to the following embedding rule.

When the digital-watermark information bit is "0", the quantizing object coefficient is quantized to a quantizing representative value of an even index closest to the coefficient.

When the digital-watermark information bit is "1", the quantizing object coefficient is quantized to a quantizing representative value of an odd index closest to the coefficient.

Note that the index is the quotient obtained by dividing the quantizing representative value by the quantizing step.

The coefficient that has undergone the aforementioned processes is output from the digital-watermark embedding device 103.

The digital-watermark embedding device 103 also outputs the quantizing step value used in the embedding process, and information indicating the embedded position of the digital-watermark information. The position indicating the embedded position of the digital-watermark information is calculated from coefficient data after the digital-watermark information has been embedded. Before embedding the digital-watermark information, a coefficient having the n_i-th largest absolute value is selected as an embedding object. However, a coefficient obtained by executing the aforementioned embedding process in that coefficient by quantization does not have the n_i-th largest absolute value.

Hence, in order to specify the embedded position upon extracting the digital-watermark information, information for specifying the embedded position on the basis of data after the digital-watermark information has been embedded is required. As such information, the information that specifies the embedded position, i.e., information indicating that the coefficient embedded with the digital-watermark information has the n'_i-th largest absolute value in the tree is used.

These pieces of information are required for extracting the digital-watermark information, and are output to the output unit 105. If these pieces of information are not available, the digital-watermark information cannot be extracted normally. Also, these pieces of information are different from information necessary for embedding, which is input to the input unit 101 in FIG. 1. That is, information necessary for extraction is generated based on information embedded with the digital-watermark information, and is different from that used in embedding.

The inverse wavelet transforming device 104 will be explained below.

The inverse wavelet transforming device 104 receives synthesis image data from the digital-watermark embedding device 103. The inverse wavelet transforming device 104 calculates the inverse wavelet transforms of the synthesis image data using the same base as the wavelet transforming device 102. The data that has undergone the inverse wavelet transform is sent to the output unit 105 as synthesis image data of the digital-watermark information.

The digital-watermark information embedding apparatus has been explained. The digital-watermark information extracting apparatus will be explained below with reference to FIG. 2.

Data (x') input to an input unit 201 contains synthesis image data in which the digital-watermark information has been embedded by the embedding apparatus shown in FIG. 1, and information necessary for extracting the digital-watermark information. The synthesis image data is sent to a wavelet transforming device 202, and the information necessary for extraction is sent to a digital-watermark extracting device 203.

The synthesis image data sent to the wavelet transforming device 202 undergoes a predetermined transform. This process must be equal to that of the wavelet transforming device 102 shown in FIG. 1. The wavelet transforming device 202 outputs frequency-transformed coefficients, which are sent to the digital-watermark extracting device 203. The digital-watermark extracting device 203 extracts the digital-watermark information from the received coefficients on the basis of the information necessary for extracting the digital-watermark information.

The digital-watermark extracting device 203 will be explained below.

From the synthesis image data input from the wavelet transforming device 202, a coefficient in which the digital-watermark information is embedded is specified. Upon specifying the coefficient, the information necessary for extraction, which is input via the input unit 201, is used. The information necessary for extraction indicates that the digital-watermark information is embedded in data having the n'_i-th largest absolute value in the tree in case of the data in which the digital-watermark information is embedded by the apparatus shown in, e.g., FIG. 1, i.e., a sequence n'_i. With this information, the coefficient in which the digital-watermark information is embedded can be specified.

After the coefficient in which the digital-watermark information is embedded is specified, the digital-watermark information is discriminated from this coefficient. For this purpose, a quantizing index corresponding to the coefficient in which the digital-watermark information is embedded is calculated. This can be calculated by dividing the coefficient in which the digital-watermark information is embedded by the quantizing index.

One bit contained in the digital-watermark information is checked using the calculated quantizing index in accordance with the following rule.

When the quantizing index is an even number, the digital-watermark information bit is "0".

When the quantizing index is an odd number, the digital-watermark information bit is "1".

When the aforementioned process is repeated for all trees, all pieces of digital-watermark information can be extracted.

In this embodiment, the processes are done in the wavelet transform domain. Also, the present invention can be applied to a case wherein digital-watermark information is directly embedded in the actual image space domain, i.e., the luminance value of a pixel and the like. For example, when the luminance value is equal to or higher than a threshold value, human vision cannot detect such small change. Hence, when the luminance value is equal to or higher than a threshold value, these coefficients are selected as digital-watermark information embedding object coefficients, and digital-watermark information that the human eye can hardly perceive can be embedded.

In this embodiment, since the digital-watermark information is embedded in a coefficient having the n_i-th largest absolute value, information indicating the n'_i-th largest absolute value position must be used as information for specifying the embedded position. Hence, the information used in embedding is different from that used in extraction.

However, when the embedded position is specified by a spatial position, i.e., a coordinate value or the like, information for specifying the embedded position need not be different before and after the digital-watermark information is embedded.

(Second Embodiment)

The second embodiment of the present invention will be described below.

In the first embodiment, in order to extract digital-watermark information, information corresponding to a key is required, and information such as the quantizing step size, embedded position, and the like is used. When a key is required in this way, the digital-watermark information may be impractical in a specific application.

For example, a case will be examined below wherein the correspondences between image data and keys are unknown. In such case, in order to extract digital-watermark information from image data, extraction must be tried using all existing keys.

In order to remove such shortcomings, this embodiment provides a digital-watermark information embedding method and extracting method, which do not require any information corresponding to a key.

FIG. 6 shows a digital-watermark embedding apparatus according to this embodiment, and FIG. 7 shows an extracting apparatus.

Referring to FIG. 6, the embedding apparatus comprises an input unit 601, wavelet transforming device 602, digital-watermark embedding device 603, inverse wavelet transforming device 604, and output unit 605.

Referring to FIG. 7, the extracting apparatus comprises an input unit 701, wavelet transforming device 702, and digital-watermark extracting device 703.

The second embodiment can be implemented by modifying the embedding method by means of selection and quantization of an embedding object coefficient in the first embodiment.

In the first embodiment, an embedding object coefficient is the one having the n_i-th largest absolute value among those included in a tree except for the coefficient in the minimum area sub-band, in consideration of the tree structure in the wavelet transform domain.

By contrast, in this embodiment, an embedding object coefficient is the one having the largest absolute value among those included in a tree in the wavelet transform domain except for the coefficient in the minimum area sub-band.

In the first embodiment, digital-watermark information is embedded by controlling the quantizing method of each coefficient.

By contrast, in this embodiment, quantization is done in only a direction to increase the absolute value, thereby embedding digital-watermark information.

In this embodiment, quantization is done in the same manner as in the first embodiment. In this case, when the absolute value of the coefficient after quantization is not the largest one in the tree, all coefficients whose absolute values have become larger than that of the coefficient after quantization may be changed to decrease their absolute values to become smaller than that of the coefficient after quantization.

In this manner, the coefficient selected as the embedding object of the digital-watermark information can have the relatively largest absolute value in the tree.

With the aforementioned two processes, a coefficient having the maximum absolute value in the tree is selected, and even after digital-watermark information is embedded, this coefficient remains to have the maximum absolute value in the tree.

Upon extracting the digital-watermark information, the need for a key, i.e., information indicating the embedded position of the digital-watermark information (information necessary for extraction in FIGS. 1 and 2) can be obviated, as shown in FIGS. 6 and 7, and a coefficient with the maximum absolute value in the tree can be specified as the one embedded with the digital-watermark information, and extraction can be proceeded.

(Third Embodiment)

The third embodiment will be described below.

This embodiment uses a key more effectively than in the first embodiment to improve secrecy of digital-watermark information.

Figure 8:
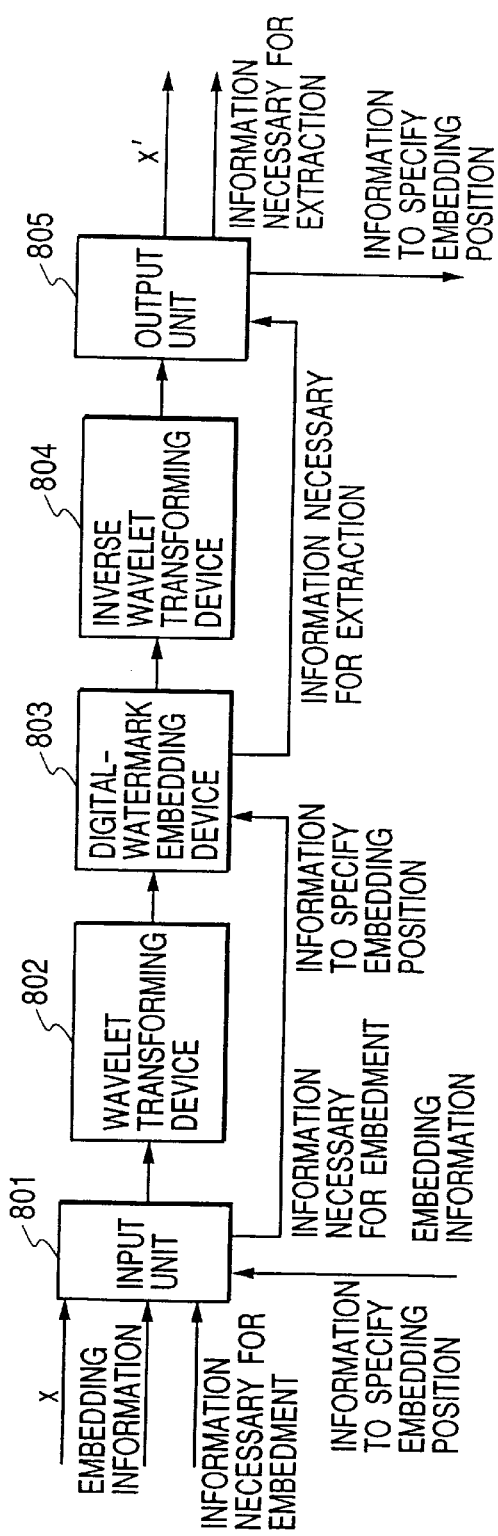
FIG. 8 is a block diagram showing a digital-watermark information embedding apparatus according to the third embodiment of the present invention.
Figure 9:
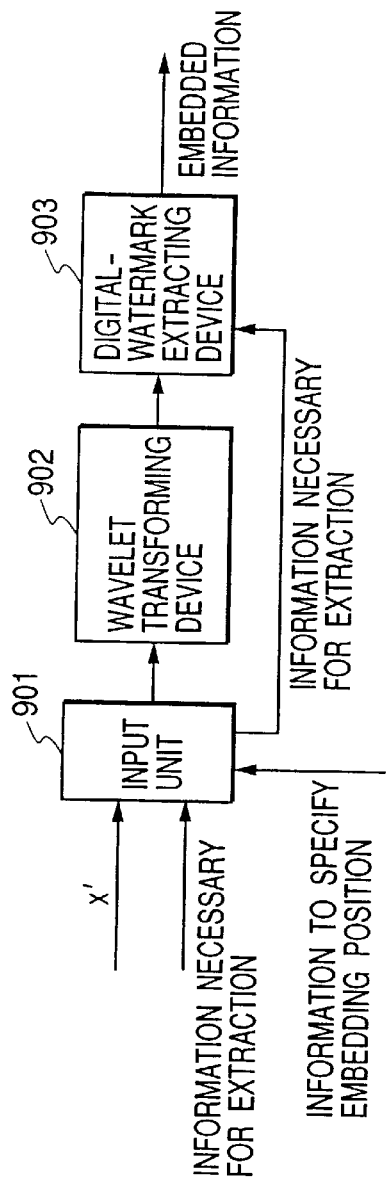
FIG. 9 is a block diagram showing a digital-watermark information extracting apparatus according to the third embodiment of the present invention.

FIG. 8 shows a digital-watermark information embedding apparatus, and FIG. 9 shows an extracting apparatus.

Referring to FIG. 8, the embedding apparatus comprises an input unit 801, wavelet transforming device 802, digital-watermark embedding device 803, inverse wavelet transforming device 804, and output unit 805.

Referring to FIG. 9, the extracting apparatus comprises an input unit 901, wavelet transforming device 902, and digital-watermark extracting device 903.

In the first embodiment, digital-watermark information is embedded in all trees in the tree structure of the wavelet transform domain.

By contrast, in this embodiment, an embedding object tree is selected based on a key. This key is, for example, a sequence generated by a random number generator. The key is output as information for specifying the embedded position from the output unit 805, and is input to the input units 801 and 901 in FIGS. 8 and 9.

According to this embodiment, random selection of a spatial location is used as a key in addition to the first embodiment that uses random selection of a frequency location as a key, thereby further improving secrecy of the embedded position of digital-watermark information.

The digital-watermark embedding device 803 selects a tree as an embedding object using an input pseudo random number sequence, and embeds digital-watermark information by one of the following methods.

One method pays attention to the tree structure in the wavelet transform domain, and embeds one bit of digital-watermark information in a randomly selected tree.

The other method pays attention to the pattern of the tree structure in place of selecting all trees as embedding objects, and only when the pattern matches a predetermined one, the corresponding tree is selected as an embedding object.

An example of the wavelet transform in three steps will be described below.

Upon executing the wavelet transform in three steps, each tree is constructed by 64 wavelet transform coefficients. These tree elements undergo a threshold value process, to determine an element equal to or higher than a threshold value to be valid, and otherwise, to determine it invalid. As a result, the tree constructed by the 64 elements has $2^{64}$ different patterns depending on whether or not each element is valid. A tree having a predetermined one of these patterns is selected as an embedding object.

In order to extract digital-watermark information embedded by this method, the predetermined pattern must be known, and this pattern information can be used as information necessary for extraction, i.e., key information.

(Fourth Embodiment)

The fourth embodiment will be described below.

This embodiment reduces the bit error rate upon extracting digital-watermark information in the first to third embodiments.

Upon extracting information in each embodiment, the embedded and extracted bit sequences may have an error. Such error may occur when image data embedded with the digital-watermark information has been attacked by deletion, destruction, and the like.

Such attacks include an intentional one; appending of noise to image data embedded with digital-watermark information, or deletion of an area where the digital-watermark information is likely to be embedded.

Other attacks include those by image processes, such as image compression, enlargement and reduction, cut-out, gradation conversion, print-out, scanning, and the like for image data embedded with digital-watermark information.

Even under such attack, as one method of normally extracting digital-watermark information, the strength upon embedding the digital-watermark information may be increased. This strength corresponds to the quantizing step size used upon embedding digital-watermark information, as described above. As the embedding strength becomes higher, robustness against attacks becomes higher. In other words, extracted bit errors can be reduced. On the other hand, as the embedding strength becomes higher, the image quality of the synthesis image becomes lower.

In consideration of this problem, this embodiment provides a method of improving robustness against attacks without changing the embedding strength in the first embodiment, i.e., without deteriorating the image quality of the synthesis image, and uses decision by majority.

Decision by majority that can be applied to the respective embodiments will be explained below.

In the first and second embodiments, one bit of digital-watermark information is embedded in turn in one tree of the tree structure in the wavelet transform domain. The embedding unit of the digital-watermark information is changed from one tree to a plurality of trees. More specifically, one bit of information is embedded in a plurality of trees. For example, the minimum area sub-band is segmented into a plurality of blocks, which do not overlap each other, and one bit of the digital-watermark information is embedded in trees contained in this block.

Figure 10:
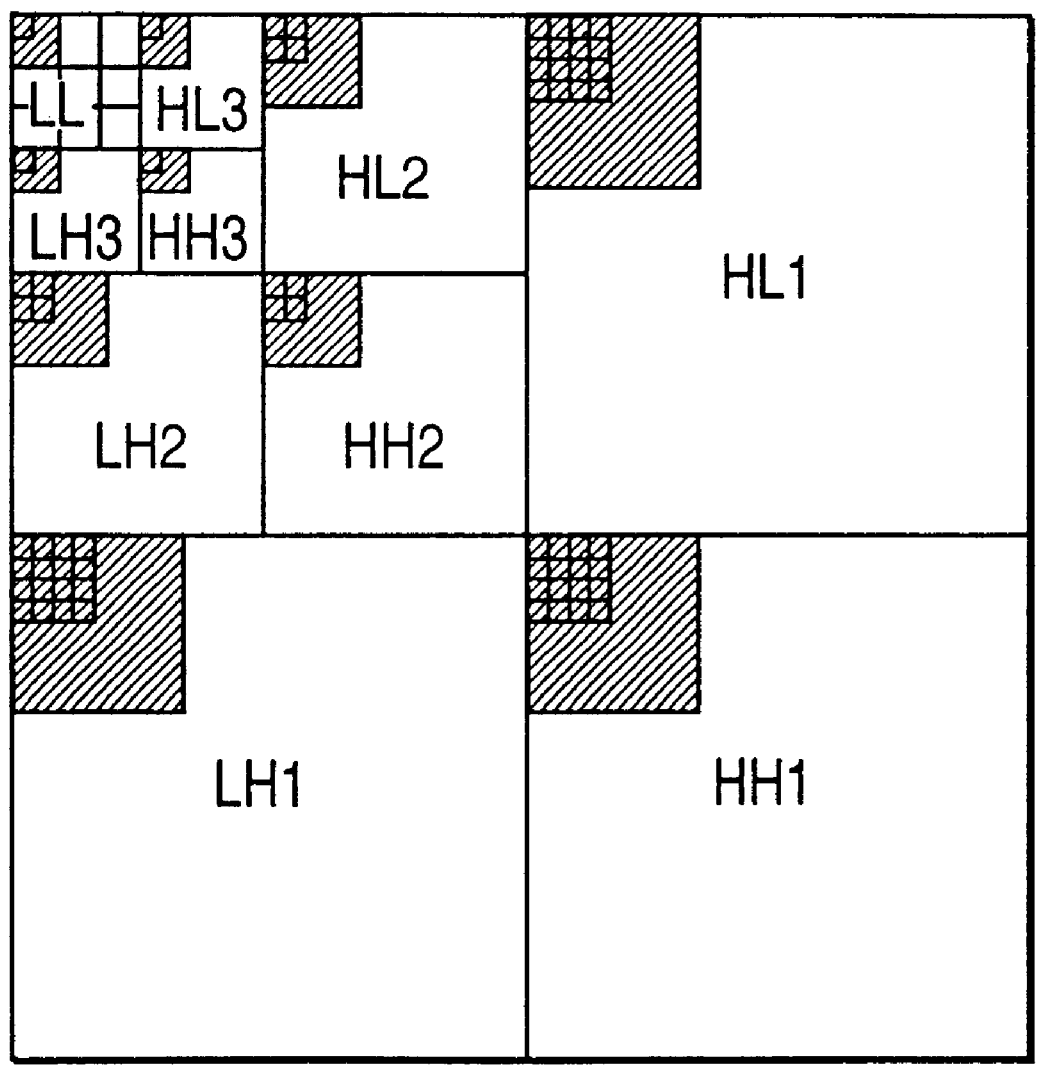
FIG. 10 is a view showing an example of trees contained in a single block according to the fourth embodiment of the present invention.
Figure 16:
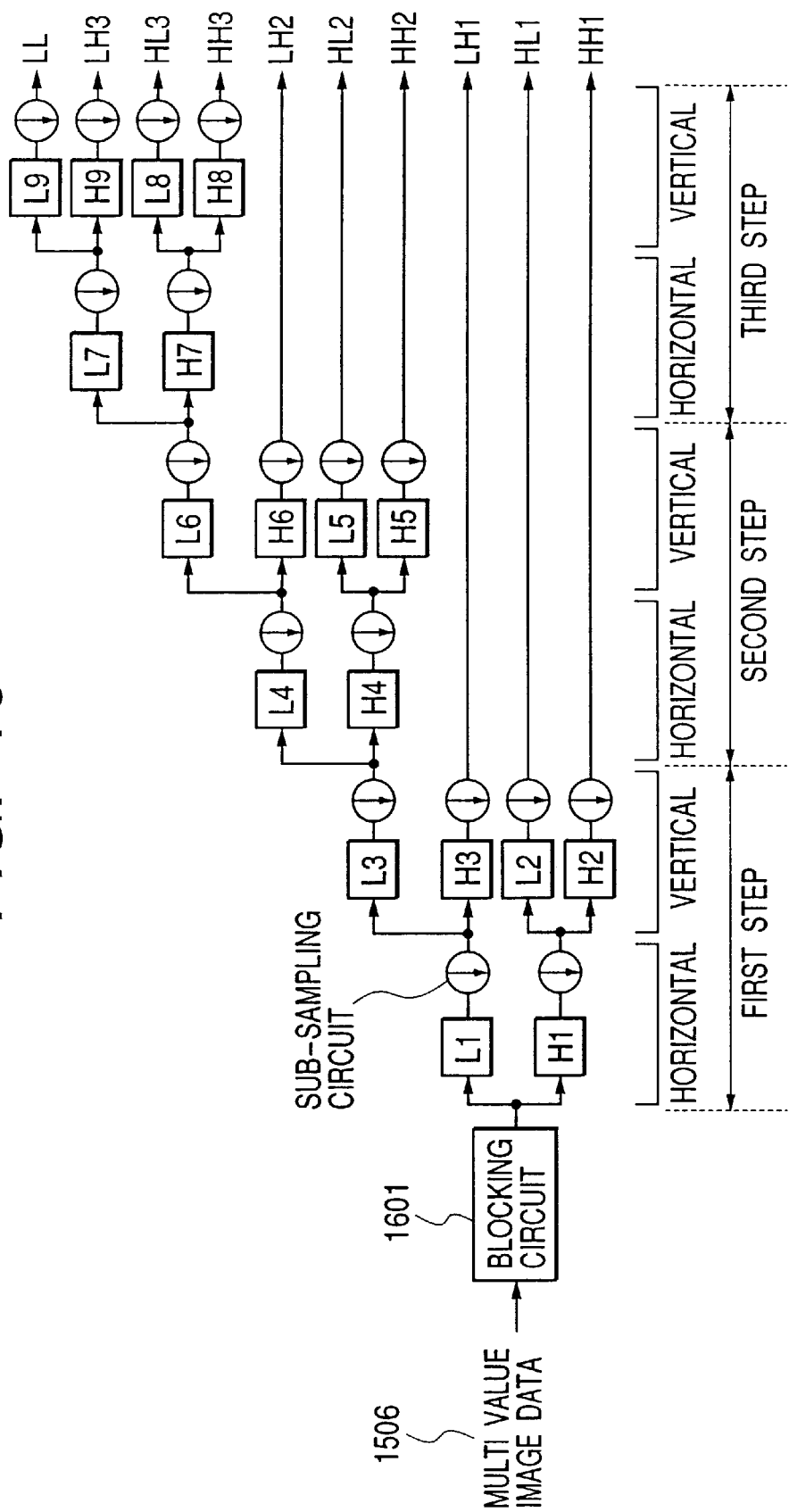
FIG. 16 is a circuit diagram showing the arrangement of a wavelet transforming unit 1502 according to the seventh embodiment of the present invention.

FIG. 10 shows an example for such method.

As shown in FIG. 10, in the wavelet transform domain, the minimum area sub-band is segmented into a plurality of blocks which do not overlap each other, and one identical bit of digital-watermark information is embedded in trees contained in an identical block. Note that the trees contained in the identical block are those indicated in gray in FIG. 10.

Upon extracting the digital-watermark information, one bit of the digital-watermark information is extracted in turn from trees contained in a block, and the majority bit is determined using a plurality of bits extracted from the trees contained in the identical block. In this manner, even when a maximum of bits half those extracted from the trees contained in a given block are erroneously detected, the information bit can be normally determined.

With the aforementioned process, robustness against attacks on digital-watermark information can be improved without increasing the embedding strength, i.e., without deteriorating image quality.

As another method, the minimum area sub-band may be segmented into a plurality of blocks, which do not overlap with each other, and an identical bit of digital-watermark information may be embedded in identical block coordinate positions of these blocks. Note that the block coordinate system is assigned to each block to have, e.g., the upper left point as an origin, and uniquely defines position in a block. When selection of blocks in which an identical bit of digital-watermark information is to be embedded is distributed over the entire image, identical bits of digital-watermark information are distributed to the entire image.

With these processes, even when an arbitrary portion is cut out from image data embedded with digital-watermark information, the digital-watermark information can be extracted from the cut-out image data portion.

When the block coordinate position is determined by a random number, secrecy can be improved.

(Fifth Embodiment)

The fifth embodiment will be described below.

This embodiment reduces the bit error rate upon extraction without increasing the embedding strength as in the fourth embodiment, and implements such reduction by error correction encoding a code sequence to be embedded as digital-watermark information. As an error correction code, various block codes such as BCH codes, Reed-Solomon codes, and the like, and convolution codes (Hideki Imai, "Coding Theory", the Institute of Electronics, Information and Communication Engineers) may be used.

FIG. 11 shows an embedding apparatus, and FIG. 12 shows an extracting apparatus.

Referring to FIG. 11, the embedding apparatus comprises an input unit 1101, wavelet transforming device 1102, digital-watermark embedding device 1103, inverse wavelet transforming device 1104, and output unit 1105, and also an error correction encoding device 1106.

Referring to FIG. 12, the extracting apparatus comprises an input unit 1201, wavelet transforming device 1202, and digital-watermark extracting device 1203, and also an error correction decoding device 1204.

The difference from the first embodiment shown in FIGS. 1 and 2 lies in that digital-watermark information is encoded by the error correction encoding device 1106 before it is embedded, and extracted information is decoded by the error correction decoding device 1204 upon extracting the digital-watermark information.

This embodiment can be combined with the fourth embodiment. More specifically, a large number of pieces of error-corrected digital-watermark information can be embedded at predetermined positions of an image by decision by majority.

In this fashion, all bits of digital-watermark information can be normally corrected and extracted from an arbitrary portion or the entire portion of an image embedded with the digital-watermark information.

(Sixth Embodiment)

The sixth embodiment will be described below.

This embodiment can completely reconstruct original image data from image data embedded with digital-watermark information.

For this purpose, the first embodiment is modified as follows. That is, in the first embodiment, information that pertains to a position where original image data has been changed upon embedding digital-watermark information is output as information necessary for extraction. In this embodiment, the difference between original image data and synthesis image data embedded with digital-watermark information, or original data at a position where data has been changed upon embedding digital-watermark information is output as information necessary for extraction in addition to the information that pertains to a position where original image data has been changed upon embedding digital-watermark information.

FIG. 13 shows an embedding apparatus, and FIG. 14 shows an extracting apparatus.

Referring to FIG. 13, the embedding apparatus comprises an input unit 1301, wavelet transforming device 1302, digital-watermark embedding device 1303, inverse wavelet transforming device 1304, and output unit 1305.

Referring to FIG. 14, the extracting apparatus comprises an input unit 1401, wavelet transforming device 1402, and digital-watermark extracting device 1403.

The difference from the first embodiment is that information necessary for reconstructing an original image is used, and a reconstructed image is output.

A case will be explained below wherein the difference between original image data and synthesis image data embedded with digital-watermark information is used as information necessary for reconstructing the original image.

Let $x\_i$ be original image data, and $x'\_i$ be image data embedded with digital-watermark information. In this case, a difference $d\_i$ between the original and synthesis image data is calculated and output by:

$$d\_i = x\_i - x'\_i \qquad (3)$$

where i is a natural number.

By adding this difference data to the synthesis image data, the original image data can be completely reclaimed. That is, $$x\_i = x'\_i + d\_i \qquad (4)$$

The difference data $d\_i$ may be considered as the digital-watermark information itself. Alternatively, the difference data $d\_i$ may be considered as key information for extracting the digital-watermark information. In this case, the difference data $d\_i$ may be compressed upon sending or storing the key information.

As the information necessary for reconstructing original image data, original data of coefficient data, which has been changed to embed digital-watermark information, may be output. In this case, in order to completely reconstruct original image data, the portion where the digital-watermark information is embedded need only be simply replaced by that original data.

(Seventh Embodiment)

The seventh embodiment will be described below.

This embodiment can implement both the function of improving robustness of digital-watermark information to be embedded in digital information (especially, image data) without increasing the embedding strength as in the fifth embodiment, and a function of detecting any change or interpolation of the digital information. More specifically, such functions are implemented by embedding an error correction encoded code sequence of digital-watermark information in predetermined coefficients set in the aforementioned trees bit by bit. The seventh embodiment will be explained in detail below.

(1) Description of Data Processing Apparatus

FIG. 15 is a block diagram showing a data processing apparatus 1500 of this embodiment.

The data processing apparatus 1500 is an apparatus for embedding predetermined digital-watermark information in image data, and comprises an image pickup means such as a digital camera, digital video camera, scanner, or the like in this embodiment.

The processing operation of the data processing apparatus 1500 will be briefly explained first.

Referring to FIG. 15, an input unit 1501 receives multi value image data 1506 which has an information volume of a predetermined number of bits per pixel, digital-watermark information 1507, and embedding parameter information 1508 which is required upon embedding the digital-watermark information 1507. The multi value image data 1506 input to the input unit 1501 is supplied to a wavelet transforming unit 1502. The digital-watermark information 1507 and embedding parameter information 1508 input to the input unit 1501 are supplied to a digital-watermark embedding unit 1503.

Note that the multi value image data 1506 is still image data or moving image data picked up by an image pickup unit 1512. The image pickup unit 1512 has one or more lenses and one or more image pickup elements, converts an optical image of an object into a predetermined electrical signal using these elements, and supplies that electrical signal to the input unit 1501 as the multi value image data 1506.

The aforementioned digital-watermark information 1507 contains at least one of copyright information, personal information of the user (e.g., the name, age, telephone number, e-mail address information, and the like), information that pertains to the multi value image data 1506 (e.g., the image pickup location, the image pickup date, user's comment, and the like), information that pertains to the data processing apparatus 1500 (e.g., product information such as the manufacturer name, model name, and the like), and two-dimensional information defined by a predetermined mark (e.g., a pattern, logo, seal, or the like).

Such information is held in advance in a digital-watermark generating unit 1514, or is set by the user himself or herself using the digital-watermark generating unit 1514. Note that the contents of the digital-watermark information 1507 are selected in correspondence with purposes such as protection of the copyright, interpolation detection, illicit copy tracking, and the like.

Referring to FIG. 15, the wavelet transforming unit 1502 executes a predetermined transform for the multi value image data 1506 for one frame supplied from the input unit 1501. Note that the operation of the wavelet transforming unit 1502 will be described in detail later. After the predetermined transform, coefficient information (each coefficient information assumes a value generated based on frequency analysis) output from the wavelet transforming unit 1502 is supplied to the digital-watermark embedding unit 1503.

The digital-watermark embedding unit 1503 embeds the digital-watermark information 1507 in predetermined coefficient information using the embedding parameter information 1508. Note that the operation of the digital-watermark embedding unit 1503 will be described in detail later. After the digital-watermark information 1507 is embedded, the digital-watermark embedding unit 1503 supplies all pieces of coefficient information to an inverse wavelet transforming unit 1504. Also, the digital-watermark embedding unit 1503 supplies extracting parameter information 1509 required for extracting the digital-watermark information 1507 from the predetermined coefficient information to an output unit 1505.

The inverse wavelet transforming unit 1504 executes a process corresponding to the transform done by the wavelet transforming unit 1502, and supplies synthesis image data 1510 (image data embedded with digital-watermark information will be referred to as synthesis image data hereinafter) as a result of the process to the output unit 1505.

The output unit 1505 externally outputs the synthesis image data 1510 embedded with the digital-watermark information 1507, and the extracting parameter information 1509 required for extracting that digital-watermark information 1507. Note that the output unit 1505 may comprise a digital interface complying with, e.g., IEEE1394 specifications. In this case, output information is supplied to an external device via a bus type transmission path. On the other hand, the output unit 1505 may comprise a radio interface complying with an infrared ray communication system as in the above embodiment. In this case, output information is supplied to an external device via a radio transmission path.

Furthermore, referring to FIG. 15, the data processing apparatus 1500 comprises a control unit 1511 for controlling the operations of the respective processing units of the data processing apparatus 1500, and a memory medium 1513 which stores a program code which can be read out by the control unit 1511.

The processing operations of the respective processing units of the data processing apparatus 1500 will be described in detail hereinafter.

(2) Description of Wavelet Transforming Unit 1502

Figure 17A:
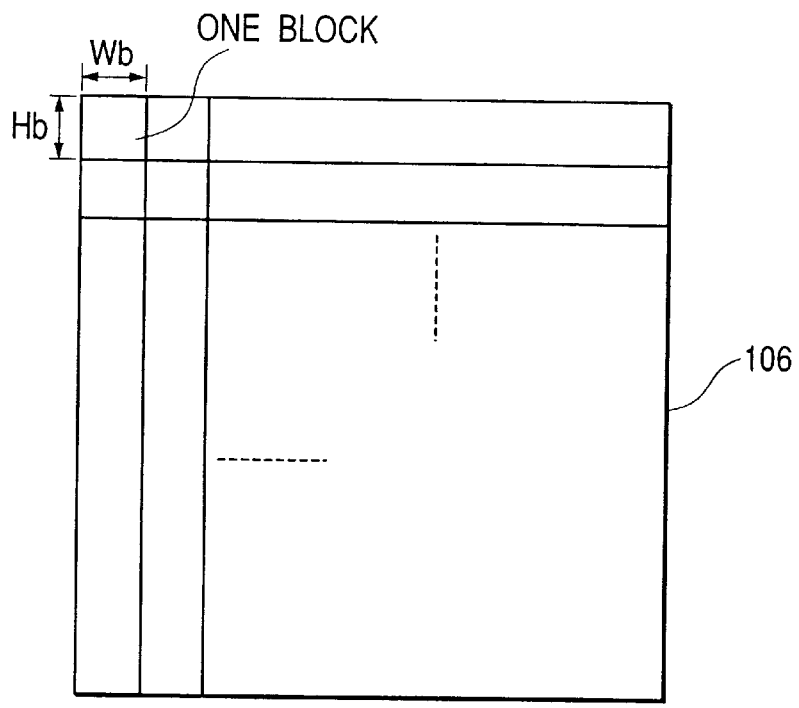
FIGS. 17A and 17B are views for explaining the block size and sub-bands generated from a block.

A blocking circuit 1601 in the wavelet transforming unit 1502 can segment the input multi value image data 1506 for one frame into one or more blocks each having a predetermined size, and can output the blocks. Note that the predetermined size is Wb pixels (horizontal)×Hb pixels (vertical) (Wb and Hb are positive integers) obtained by segmenting the multi value image data 1506 for one frame, as shown in FIG. 17A.

The wavelet transforming unit 1502 calculates the wavelet transforms of the individual image data blocks output from the blocking circuit 1601, and divides each of these blocks into a plurality of sub-bands (LL, LH3, . . . , HL1, HH1). Note that the wavelet transforming unit 1502 of this embodiment processes each block in three steps, as in the above embodiments.

Figure 17B:
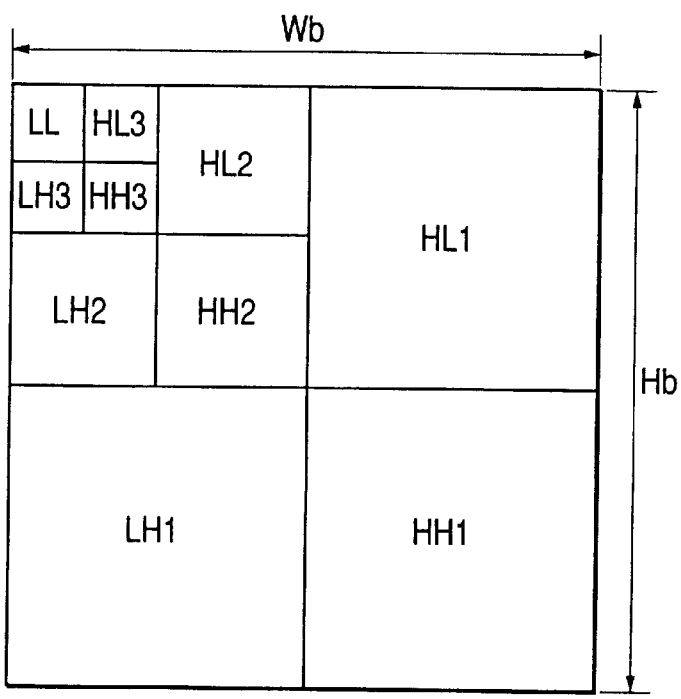
Figure 18A:
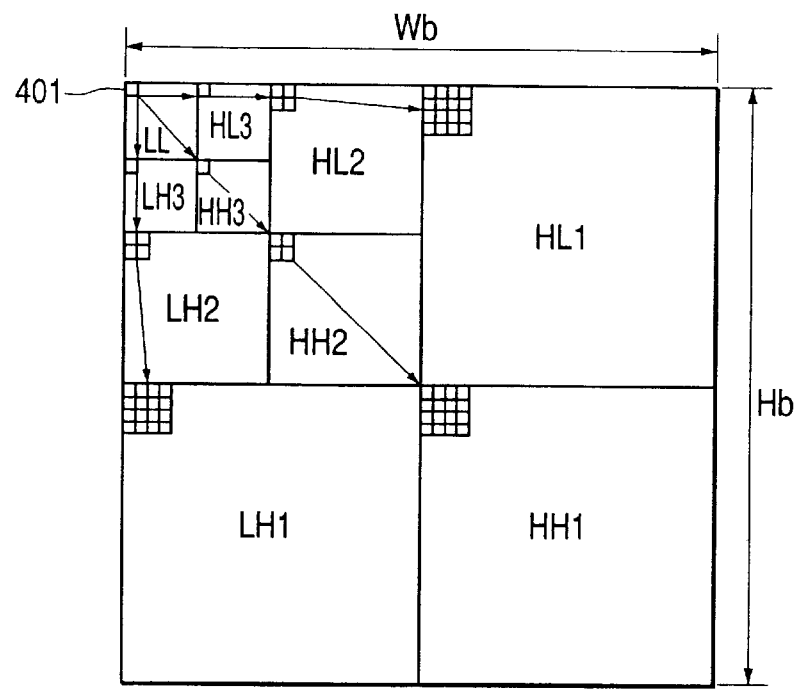
FIGS. 18A and 18B are views showing the tree structure in the wavelet transform domain.
Figure 18B:
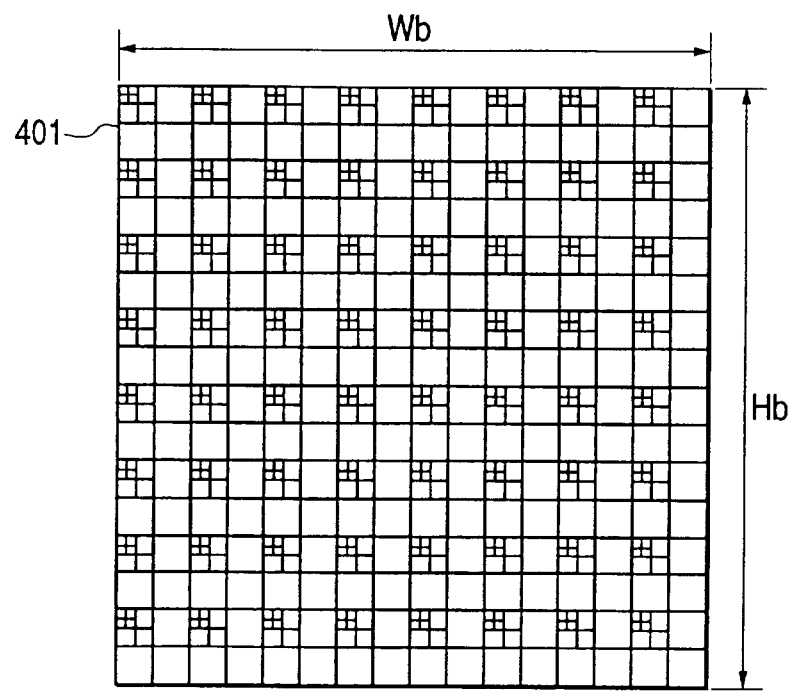

With this process, a plurality of sub-bands generated from one block can be expressed, as shown in FIG. 17B. Also, one tree 401 in one block has a structure, as shown in FIG. 18A. Each tree corresponds to a predetermined spatial position of an original image. Hence, a plurality of trees in one block correspond to their spatial positions, as shown in FIG. 18B.

As described above, the wavelet transforming unit 1502 of the seventh embodiment calculates the wavelet transforms of the multi value image data 1506 composed of one or more blocks in units of blocks, and sequentially supplies a plurality of trees generated from the respective blocks to the digital-watermark embedding unit 1503.

(3) Description of Digital-Watermark Embedding Unit 1503

Figure 19:
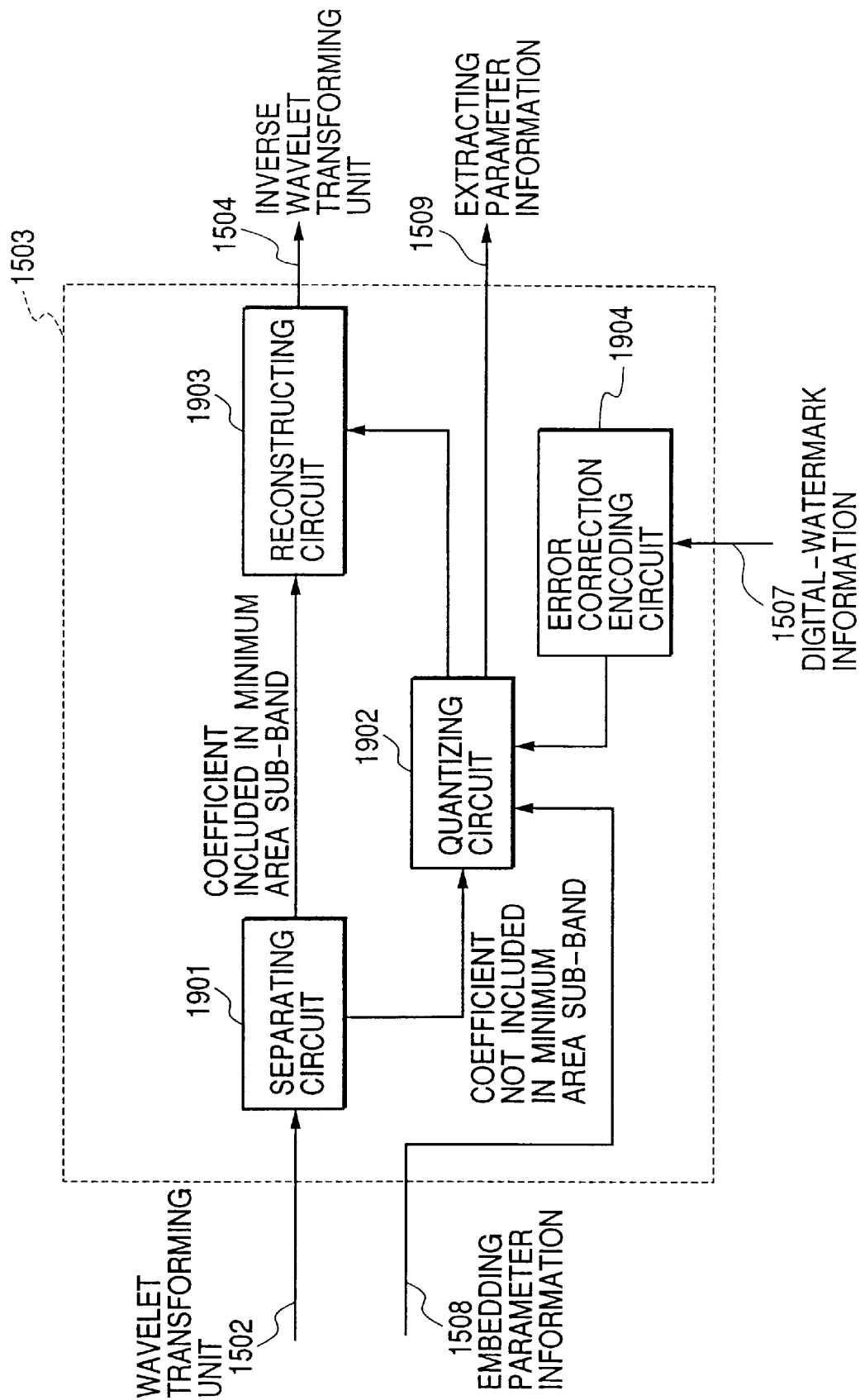
FIG. 19 is a block diagram for explaining the arrangement of a digital-watermark embedding unit 1503 of the seventh embodiment.
Figure 20:
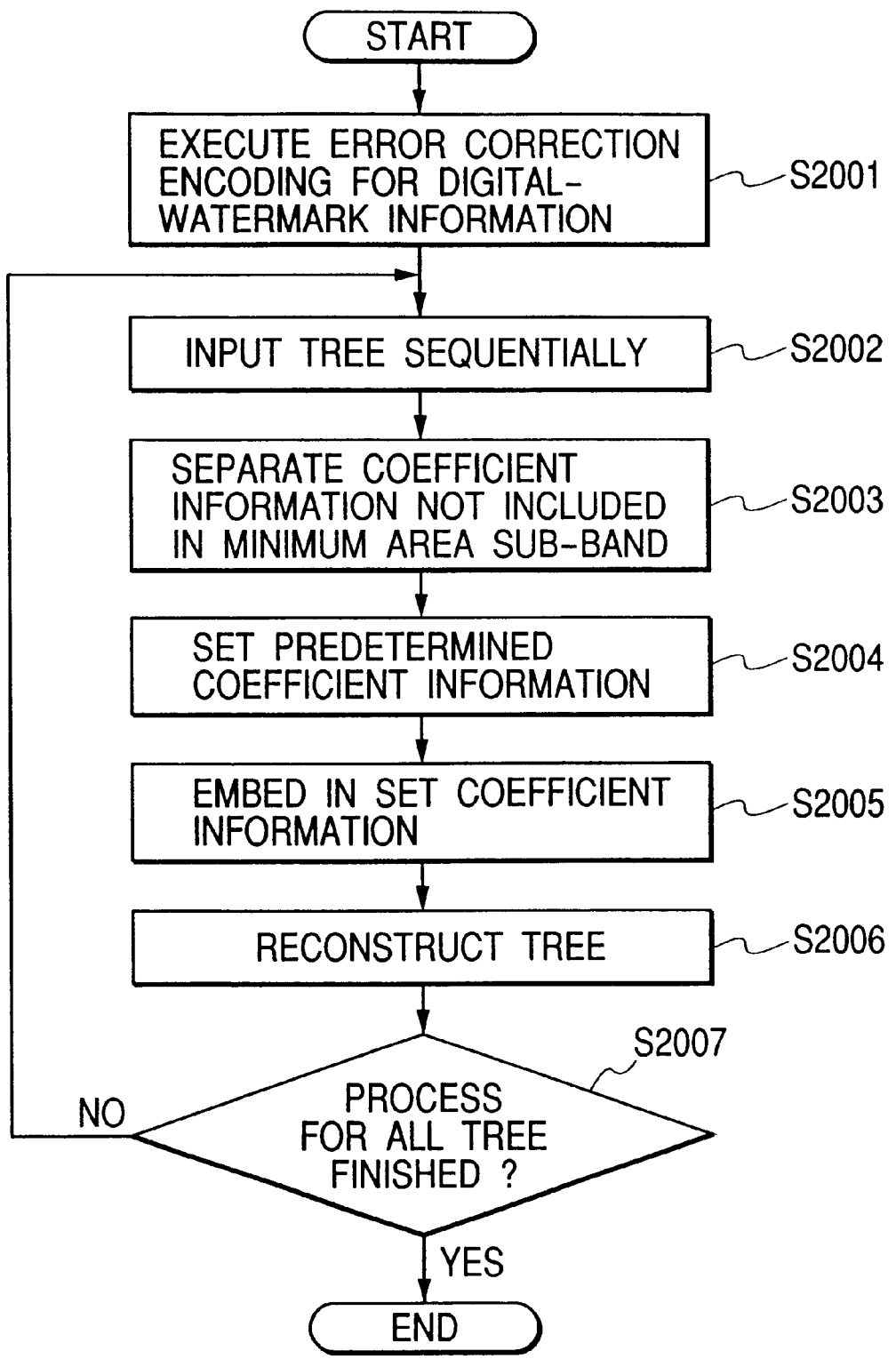
FIG. 20 is a flow chart for explaining the operation of the digital-watermark embedding unit 1503 of the seventh embodiment.
Figure 21:
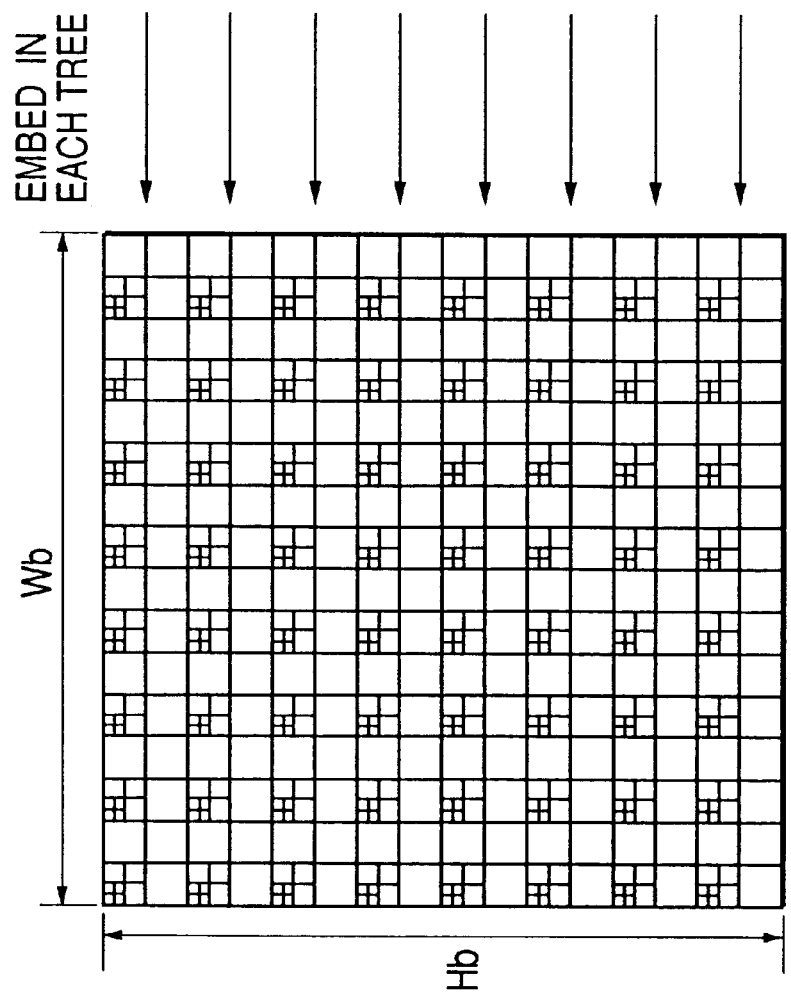
FIGS. 21A and 21B are views for explaining the relationship between image data for one block and error correction encoding digital-watermark information.

The operation of the digital-watermark embedding unit 1503 will be described in detail below with reference to FIGS. 19 to 21B. FIG. 19 is a block diagram for explaining the arrangement of the digital-watermark embedding unit 1503 of this embodiment. FIG. 20 is a flow chart for explaining the operation of the digital-watermark embedding unit 1503 of this embodiment. FIGS. 21A and 21B are views for explaining the relationship between image data for one block and error correction encoding digital-watermark information.

As described above, when a normal natural image is wavelet-transformed, a sub-band (LL) containing the lowest frequency component includes signals having a very large information volume, and other sub-bands include local signals having a small information volume such as edge portions, texture regions, and the like of an image. Also, as described earlier, human vision is such that "it is hard for us to perceive a small change in a high-frequency range".

With such characteristics, in order to embed digital-watermark information without deteriorating an original image, the digital-watermark information must be embedded in sub-bands composed of high-frequency components. Hence, the digital-watermark embedding unit 1503 of this embodiment embeds the digital-watermark information 1507 in sub-bands other than the aforementioned minimum area sub-band (i.e., a sub-band containing the lowest frequency component).

The digital-watermark embedding unit 1503 of the seventh embodiment uniformly embeds the digital-watermark information 1507 that has been error correction encoded (to be referred to as error correction encoding digital-watermark information hereinafter) in the entire image data in one block. More specifically, the digital-watermark embedding unit 1503 embeds 1-bit information in all trees generated from one block.

The process for embedding the error correction encoding digital-watermark information in image data for one block will be described below with reference to FIGS. 19 to 21B.

In step S2001, an error correction encoding circuit 1904 error correction encodes the digital-watermark information 1507 to generate error correction encoding digital-watermark information shown in FIG. 21B. Referring to FIG. 21B, the digital-watermark information 1507 includes of D1 to D48, each of which is 1-bit information. Also, P1 to P16 are parity bits for the digital-watermark information (D1 to D48). The error correction encoding digital-watermark information is temporarily held in the error correction encoding circuit 1904, and is supplied to a quantizing circuit 1902 as needed.

In step S2002, a separating circuit 1901 sequentially receives trees supplied from the wavelet transforming unit 1502. FIG. 21A shows the relationship between original image data for one block and a plurality of trees. Referring to FIG. 21A, each tree includes image data corresponding to predetermined spatial positions, and is formed by a plurality of sub-bands including one or more coefficient information.

In step S2003, the separating circuit 1901 separates a plurality of pieces of coefficient information that form each tree into that contained in the minimum area sub-band and those contained in other sub-bands. The separating circuit 1901 supplies the coefficient information contained in the minimum area sub-band to a reconstructing circuit 1903, and coefficient information contained in other sub-bands to the quantizing circuit 1902.

In step S2004, the quantizing circuit 1902 sets coefficient information in which error correction encoding digital-watermark information for 1 bit (e.g., D1) is embedded from a plurality of pieces of coefficient information that form each tree. In this case, the coefficient information in which 1-bit information is to be embedded is selected by, e.g., a random number generator of the quantizing circuit 1902. Note that the coefficient information selected by the random number generator is externally supplied as one of the extracting parameter information 1509 required for extracting the digital-watermark information 1507 from the synthesis image data 1510.

In step S2005, the quantizing circuit 1902 embeds error correction encoding digital-watermark information for 1 bit in the coefficient information selected from each tree. The tree in which 1-bit information has been embedded is supplied in turn to the reconstructing circuit 1903.

Note that the quantizing circuit 1902 of this embodiment embeds a code sequence of error correction encoding digital-watermark information in coefficient information of the respective trees bit by bit by the same embedding method as in the above embodiments. In this embodiment, the control unit 1511 can freely set the value of the quantizing step used in the quantizing circuit 1902 in correspondence with the feature of image data for one block. The value of the quantizing step used in the quantizing circuit 1902 is externally supplied as one of the extracting parameter information required for extracting the digital-watermark information 1507 from the synthesis image data 1510.

In step S2006, the reconstructing circuit 1903 reconstructs the tree shown in FIG. 18A by synthesizing the coefficient information contained in the minimum area sub-band (supplied from the separating circuit 1901), and coefficient information contained in other sub-bands (supplied from the quantizing circuit 1902).

If it is determined in step S2007 that trees to be subjected to the embedding process still remain, the processes in step S2002 and the subsequent steps are repeated. After the embedding process is completed for all the trees, the output from the reconstructing circuit 1903 is supplied to the inverse wavelet transforming unit 1504 as the output from the digital-watermark embedding unit 1503.

When the aforementioned processes are executed for all the trees, the digital-watermark embedding unit 1503 can uniformly embed error correction encoding digital-watermark information in all the trees of image data for one block. Note that the digital-watermark embedding unit 1503 executes the aforementioned embedding process for all the blocks that construct image data for one frame to embed identical error correction encoding digital-watermark information in the respective blocks.

As described above, since the data processing apparatus 1500 of the seventh embodiment embeds digital-watermark information in predetermined coefficient information contained in sub-bands other than the minimum area sub-band, digital-watermark information can be embedded without deteriorating the original image.

The digital-watermark embedding unit 1503 of the seventh embodiment can embed digital-watermark information that has superior robustness against attacks and can be used to specify any changed or interpolated position.

Especially, when the data processing apparatus 1500 of the seventh embodiment is a digital camera or digital video camera, digital-watermark information (for example, personal information of the user or copyright information) which is highly secure and can be used to specify any changed or interpolated position can be embedded in image data picked up by the user, using the aforementioned embedding method. In this manner, the copyright information of image data picked up by the user can be protected, and an unauthorized use of that image data can be detected.

On the other hand, when the data processing apparatus 1500 of the seventh embodiment is a scanner, digital-watermark information (e.g., product information of the scanner) which is highly secure and can be used to specify any changed or interpolated position can be embedded in an image scanned by the user. Hence, an unauthorized use of an image scanned by the user can be detected, and an illicit copy can be tracked.

(4) Description of Data Processing Apparatus 2200

Figure 22:
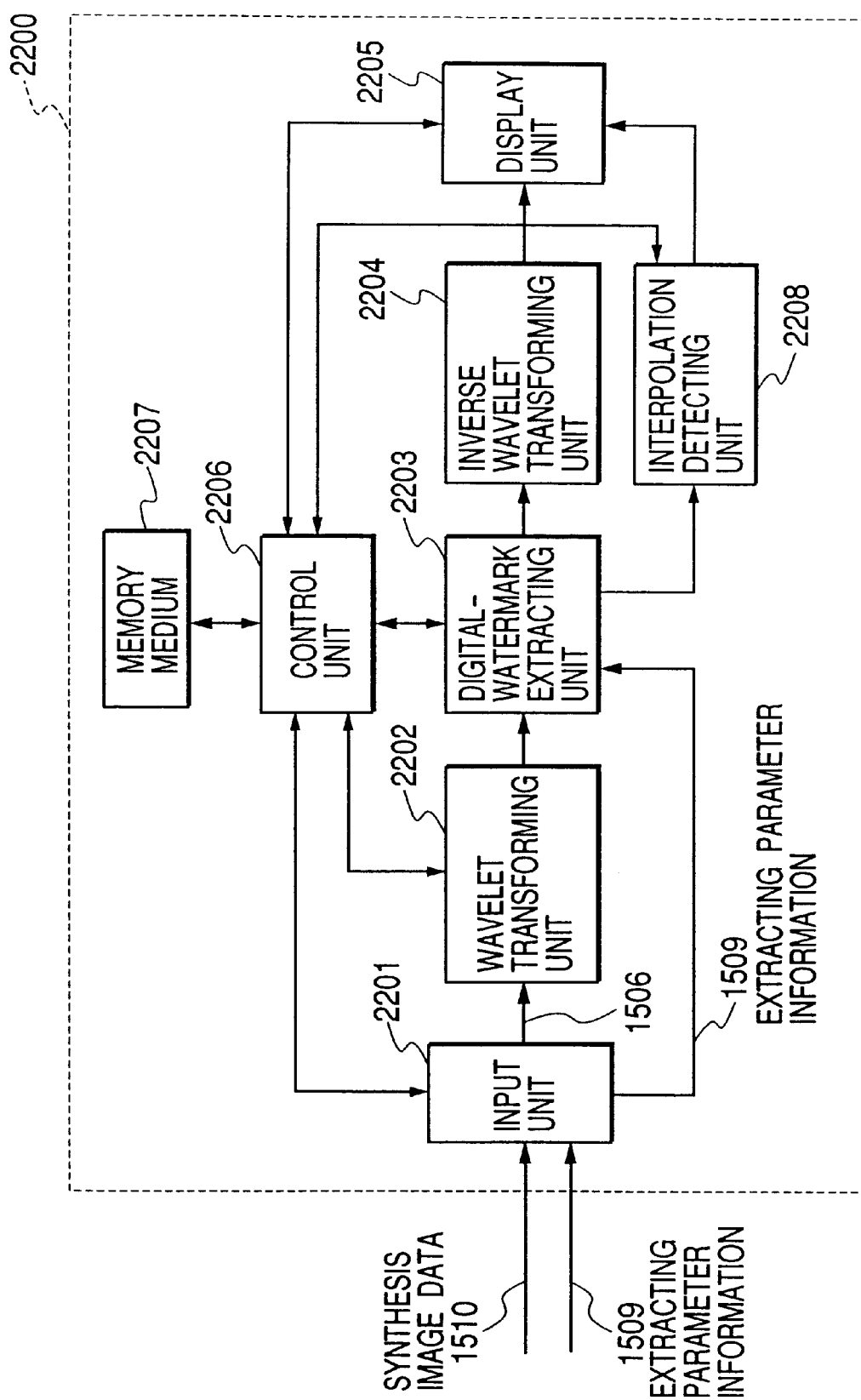
FIG. 22 is a block diagram showing a data processing apparatus 2200 of the seventh embodiment.

FIG. 22 is a block diagram showing a data processing apparatus 2200 of the seventh embodiment. The data processing apparatus 2200 is an apparatus for extracting error correction encoding digital-watermark information embedded by the data processing apparatus 1500. Note that the data processing apparatus 2200 is an information processing apparatus such as a personal computer or the like.

Figure 23:
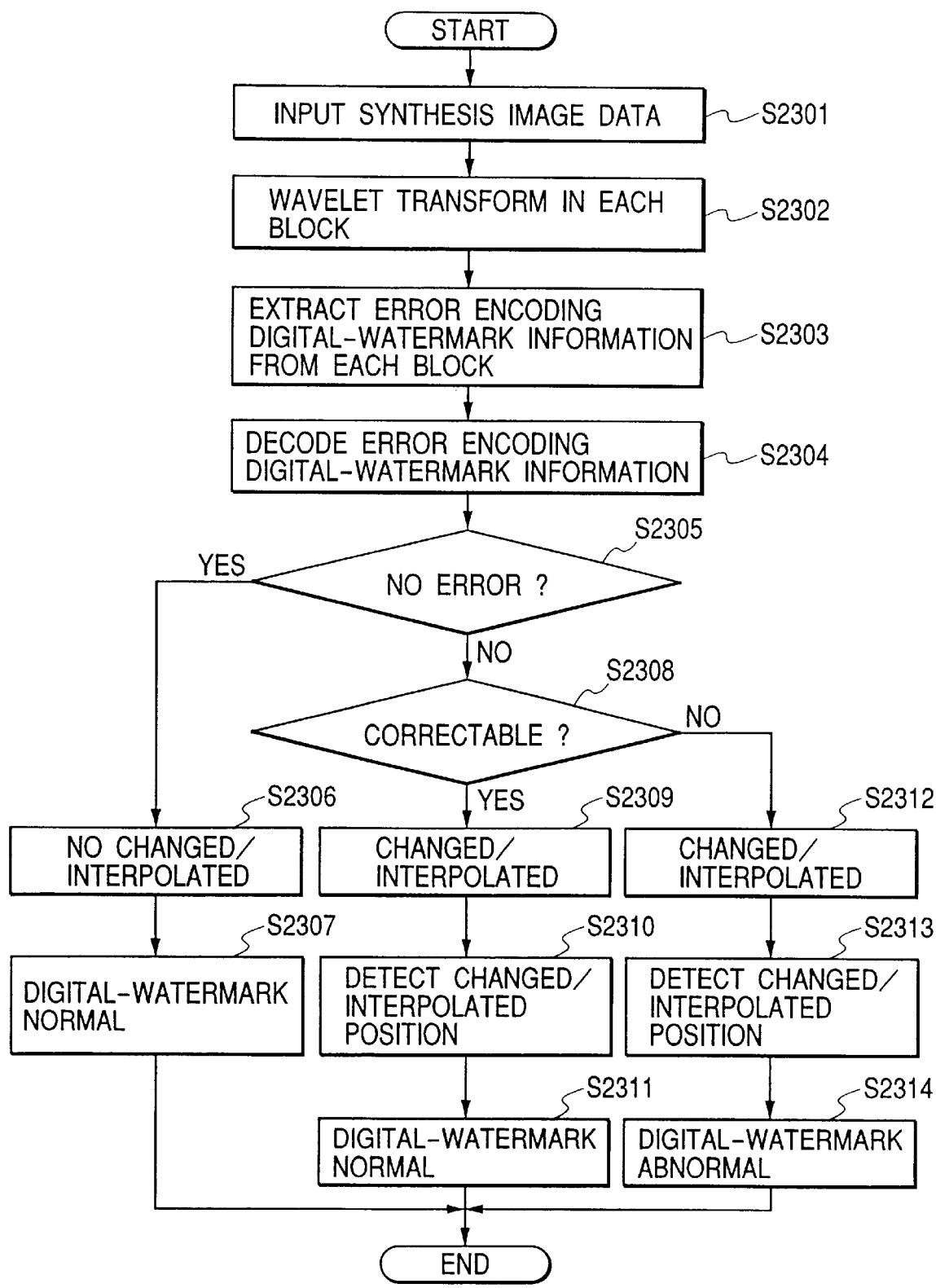
FIG. 23 is a flow chart for explaining the extraction processes of the data processing apparatus 2200.

The extracting process of the data processing apparatus 2200 will be explained below with reference to FIG. 23.

In step S2301, an input unit 2201 receives the synthesis image data 1510 and extracting parameter information 1509 processed by the data processing apparatus 1500 shown in FIG. 15. The synthesis image data 1510 input to the input unit 2201 is supplied to a wavelet transforming unit 2202. On the other hand, the extracting parameter information 1509 input to the input unit 2201 is supplied to a digital-watermark extracting unit 2203.

In step S2302, the wavelet transforming unit 2202 executes the same processes as the above-mentioned wavelet transforming unit 1502 for the synthesis image data 1510. More specifically, the wavelet transforming unit 2202 calculates the wavelet transforms of the synthesis image data 1510 in units of blocks, and sequentially supplies all trees (each tree contains predetermined coefficient information embedded with error correction encoding digital-watermark information) generated from each block to the digital-watermark extracting unit 2203.

In step S2303, the digital-watermark extracting unit 2303 specifies the aforementioned predetermined coefficient information using the extracting parameter information 1509, and extracts error correction encoding digital-watermark information for one bit from each tree. The extracted error correction encoding digital-watermark information is supplied to an interpolation detecting unit 2208.

Note that the digital-watermark extracting unit 2203 executes processes corresponding to the digital-watermark embedding unit 1503. More specifically, the digital-watermark extracting unit 2203 dequantizes the predetermined coefficient information contained in sub-bands other than the minimum area sub-band of each tree, thus extracting 1-bit embedded information.

In step S2304, the interpolation detecting unit 2208 decodes the error correction encoding digital-watermark information extracted from each block, and detects and corrects an error produced in that information. Also, the detection result of the interpolation detecting unit 2208 is supplied to a control unit 2206.

If it is determined in step S2305 that no error is detected, the control unit 2206 determines that a block from which the error correction encoding digital-watermark information of interest is extracted has neither a changed nor an interpolated position (step S2306). Furthermore, the control unit 2206 determines that the digital-watermark information extracted from that block is authentic information (step S2307). In this case, the interpolation detecting unit 2208 supplies the digital-watermark information extracted from that block to a display unit 2205.

If it is determined in step S2308 that the detected error falls within a correctable range, the control unit 2206 determines that the block from which the error correction encoding digital-watermark information of interest is extracted is likely to have been changed or interpolated (step S2309). The control unit 2206 detects a tree from which the error information is extracted, and determines a spatial position corresponding to that tree as a changed or interpolated position (step S2310). In this case, the control unit 2206 supplies a warning message indicating that data may have been tampered with or interpolated, and the interpolated position to the display unit 2205.

After the process in step S2310, the control unit 2206 determines that digital-watermark information, which is extracted from one block and is error corrected, is normal information (step S2311). In this case, the interpolation detecting unit 2208 supplies the digital-watermark information extracted from that block to the display unit 2205.

If it is determined in step S2308 that an error that cannot be corrected is detected, the control unit 2206 determines that the block from which the error correction encoding digital-watermark information of interest is extracted has a changed or interpolated position (step S2312). The control unit 2206 detects a tree from which the error information is extracted, and determines a spatial position corresponding to that tree as a changed or interpolated position (step S2313). In this case, the control unit 2206 supplies a warning message indicating that a change or interpolation has been detected, and the interpolated position to the display unit 2205.

After the process in step S2313, the control unit 2206 determines that digital-watermark information extracted from one block is corrupted information (step S2314). In this case, the interpolation detecting unit 2208 does not supply the digital-watermark information extracted from that block to the display unit 2205.

Image data for one block that has been processed by the digital-watermark extracting unit 2203 is supplied to an inverse wavelet transforming unit 2204. Note that the inverse wavelet transforming unit 2204 executes the same processes as the aforementioned inverse wavelet transforming unit 1504.

Image data that has undergone the inverse wavelet transform by the inverse wavelet transforming unit 2204 in units of blocks is supplied to the display unit 2205.

The display unit 2205 visually displays image data for one frame and the digital-watermark information 1507 extracted from that image data on a single screen. When an error has been detected by the interpolation detecting unit 2208, or when normal digital-watermark information cannot be detected, the warning message and interpolated position generated by the control unit 2206 can be visually displayed to be superposed on the image data. In this manner, the user can recognize any change or interpolation of the synthesis image data 1510, and can also recognize whether or not that data is authentic, copyright-protected data.

As described above, the data processing apparatus 2200 of the seventh embodiment can detect the presence/absence of any change or interpolation in the block and can also specify the interpolated position by decoding error correction encoding digital-watermark information extracted from that block.

When an error of the error correction encoding digital-watermark information extracted from the block falls within a correctable range, the data processing apparatus 2200 of the seventh embodiment can recognize that the digital-watermark information is normal, and the robustness of the digital-watermark information can be consequently increased.

The digital-watermark embedding unit 1503 of the seventh embodiment embeds error correction encoding digital-watermark information in all the trees generated from image data for one block. However, the present invention is not limited to such specific arrangement. For example, when each of D1 to D48 in FIG. 21B includes of a plurality of bits, a plurality of pieces of coefficient information serving as embedding objects may be selected per tree, and a plurality of bits of information may be embedded in these pieces of coefficient information.

In this manner, the digital-watermark embedding unit 1503 can increase the information volume of the digital-watermark information that can be embedded per block. Alternatively, error correction encoding digital-watermark information with stronger error correction performance may be embedded if the information volume of the digital-watermark information to be embedded remains the same.

Figure 24A:
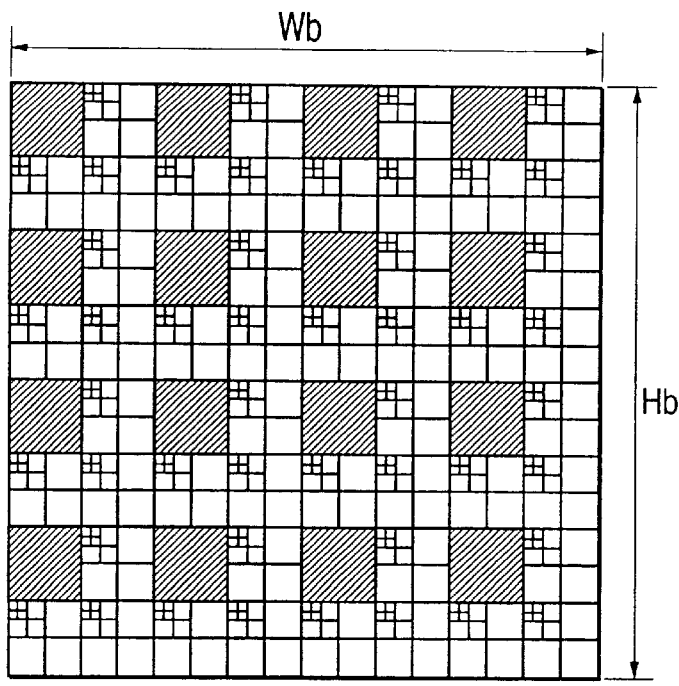
FIGS. 24A and 24B are views showing examples of trees to be embedded.
Figure 24B:
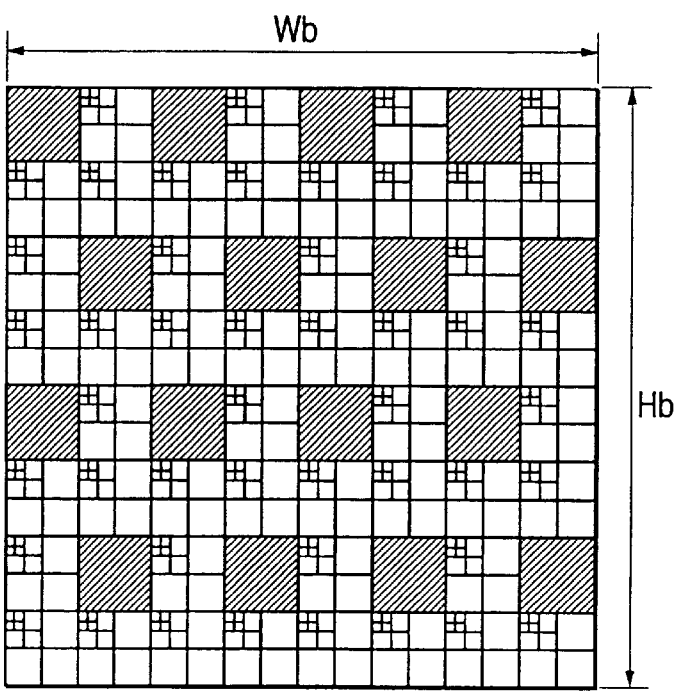

The digital-watermark embedding unit 1503 of the seventh embodiment embeds error correction encoding digital-watermark information in all the trees generated from image data for one block. However, the present invention is not limited to such specific arrangement. Since the user alters or interpolates a range containing one or more trees as a unit, error correction encoding digital-watermark information for one or more bit may be embedded in one of four neighboring trees, as shown in, e.g., FIG. 24A. Also, the present invention is not limited to this. Information for one or more bit may be embedded in trees corresponding to spatial positions at equal spacings, or trees regularly selected, as shown in FIG. 24B.

In this fashion, the digital-watermark embedding unit 1503 can shorten the time required for the embedding process, and can further suppress deterioration of an original image resulting from the embedding process. In this case, the tree serving as an embedding object is selected based on color information, luminance information, edge information, contents information, and the like.

The digital-watermark embedding unit 1503 of the seventh embodiment embeds one error correction encoding digital-watermark information 1507 in image data for one block. However, the present invention is not limited to such specific arrangement. For example, when the number of bits of error correction encoding digital-watermark information to be embedded is smaller than the total number of trees, a plurality of pieces of identical error correction encoding digital-watermark information may be repetitively embedded. For example, when D1 to D12 in FIG. 21B express one digital-watermark information 1507, four pieces of identical information are embedded in image data for one block.

In this fashion, if at least one of a plurality of pieces of error correction encoding digital-watermark information can be normally extracted, the data processing apparatus 2200 can protect the contents of that digital-watermark information, and as a result, the robustness can be increased.

In this case, a majority discriminator may be added to the interpolation detecting unit 2208, and the interpolated position may be detected by comparing a plurality of pieces of digital-watermark information. In case of decision by majority, the interpolation detecting unit 2208 discriminates with reference to the error rate of a medium (e.g., a communication path or recording medium) that supplies the synthesis image data 1510. That is, the error rate that normally occurs in a transmission medium, recording medium, or the like is used as a reference value, and if the error rate is equal to or smaller than the reference value, it is determined that no error is detected; otherwise, it is determined that data has been corrupted.

The digital-watermark embedding unit 1503 of the seventh embodiment selects coefficient information serving as an embedding object in each tree by a random number generator. However, the present invention is not limited to such specific arrangement. For example, as in the aforementioned embodiments, coefficient to serve as an embedding object may be fixed or may be selected according to a predetermined rule. In this case, the fixed coefficient information or the predetermined rule is used as one of the embedding parameter information 1508.

In this manner, the data processing apparatuses 1500 and 2200 can simplify the circuit arrangements and operation control of the digital-watermark embedding unit 1503 and digital-watermark extracting unit 2203.

The digital-watermark embedding unit 1503 of the seventh embodiment embeds error correction encoding digital-watermark information in wavelet-transformed image data for one block. However, the present invention is not limited to such specific arrangement. For example, error correction encoding digital-watermark information may be embedded in image data that has been transformed using orthogonal transforms (discrete cosine transform, Fourier transform, and the like) other than the wavelet transform.

In this case, the region to be subjected to the orthogonal transform must correspond to a predetermined spatial position of an original image. For example, an original image may undergo the discrete cosine transform in units of blocks each composed of 8×8 pixels, and error correction encoding digital-watermark information of one or more bit may be embedded in each block. Also, identical error correction encoding digital-watermark information may be embedded in the respective blocks.

In this manner, even when image data for one block is transformed by an orthogonal transform other than the wavelet transform, the digital-watermark embedding unit 1503 can embed digital-watermark information, which can improve robustness against attacks, and can detect the presence/absence of a change or interpolation in units of blocks.

Furthermore, the data processing apparatuses 1500 and 2200 of the seventh embodiment control the method of embedding error correction encoding digital-watermark information in image data, and the extracting method corresponding to that embedding method. However, the present invention is not limited to such specific arrangement. For example, the aforementioned embedding and extracting methods may be applied to graphics data, text data, and the like to achieve both protection of copyright information and detection of the presence/absence of interpolation of each data.

(Eighth Embodiment)

A memory medium according to the eighth embodiment of the present invention will be explained below.

The object of the present invention can be achieved by a computer system constructed by a memory medium and CPU. That is, a memory medium which stores the program code of software that implements the processes by means of operations described in the above embodiments or the processes shown in the flow charts in FIGS. 20 and 23 is used in a system or apparatus, and the CPU of the system or apparatus reads out and executes the program code stored in the memory medium, thus achieving the object of the present invention.

In such case, the program code itself read out from the memory medium implements the functions of the aforementioned embodiments, and the memory medium that stores the program code constructs the present invention.

As the memory medium, a semiconductor memory such as a ROM, RAM, or the like, an optical disk, a magnetooptical disk, a magnetic medium, and the like may be used, and they may form a CD-ROM, floppy disk, magnetic medium, magnetic card, nonvolatile memory card, and the like.

Therefore, when a system or apparatus other than the system or apparatus shown in FIGS. 1, 2, 6, 9, 11, 16, 19, 22, and the like uses this memory medium, and reads out and executes the program code stored in that memory medium, functions equivalent to those of the aforementioned embodiments can be implemented, and the same effects can be obtained, thus achieving the object of the present invention.

Also, functions equivalent to those of the aforementioned embodiments can be implemented and the same effects can be obtained when an OS or the like running on a computer executes some or all processes, or when the program code read out from the memory medium is written in a memory provided to an expansion function board inserted in the computer or an expansion function unit connected to the computer, and the CPU or the like of the expansion function board or unit then executes some or all processes. Thus, the object of the present invention can be achieved.

According to the above embodiments, digital-watermark information can be embedded in data without deteriorating the quality of original data.

Since a coefficient with a large absolute value in the wavelet transform domain is used as an embedding object of digital-watermark information, digital-watermark information can be embedded in data without deteriorating the data quality.

When a plurality of trees as sets of coefficients present at identical spatial positions are extracted as the coefficient, and digital-watermark information is embedded, the data quality can be prevented from deteriorating, and the digital-watermark information can be reliably extracted even when data embedded with digital-watermark information has been attacked by, e.g., deletion, destruction, cut-out, and the like.

When each tree is selected by a random number, the secrecy of digital-watermark information can be improved.

When digital-watermark information is embedded in a coefficient with a maximum absolute value in each tree, the digital-watermark information can be extracted from data without using any key information.

When digital-watermark information is embedded after it is error correction encoded, the error rate can be reduced upon extracting the digital-watermark information.

When information that pertains to the embedded position of digital-watermark information is output together with data embedded with the digital-watermark information, the digital-watermark information can be extracted from that data using the information that pertains to the position as key information.

When data embedded with digital-watermark information, and difference information between the data embedded with the digital-watermark information and the input data, or original data at the embedded position of the digital-watermark information in the input data are output, original data can be reliably reconstructed upon extracting the digital-watermark information.

Furthermore, when the digital-watermark information is extracted using majority discrimination from input data in which identical digital-watermark information is embedded in a plurality of predetermined ones of wavelet-transformed coefficients, the digital-watermark information can be reliably extracted from even data that has been attacked.

Since digital-watermark information is embedded in predetermined coefficient information contained in sub-bands other than the minimum area sub-band, the digital-watermark information can be embedded without deteriorating the original image.

In order to improve the robustness of digital-watermark information to be embedded, error correction encoding digital-watermark information can be embedded. In this manner, even when the image data has been slightly changed, if errors produced by such change fall within a correctable range, the contents of the digital-watermark information of that image data can be protected.

Also, error correction encoding digital-watermark information can be uniformly embedded in the entire image. In this manner, the presence/absence of interpolation can be detected from errors, which are detected from the error correction encoding digital-watermark information. If the detected errors fall within a correctable range, the contents of the embedded digital-watermark information can be protected, and the robustness can be consequently improved.

Moreover, identical error correction encoding digital-watermark information can be embedded in the respective regions (e.g., blocks) of image data. In this manner, by comparing error correction encoding digital-watermark information extracted from the respective regions, the interpolated region can be specified.

If errors of error correction encoding digital-watermark information extracted from at least one of the plurality of regions fall within a correctable range, the contents of the digital-watermark information embedded in the image can be protected, and the robustness can be consequently improved.

(Ninth Embodiment)

This embodiment minimizes deterioration of image quality in an image, in which a digital-watermark is embedded, by selecting the quantizing scheme upon embedding the digital-watermark in correspondence with the magnitude of a coefficient to be quantized.

FIG. 25 is a block diagram showing a digital-watermark embedding apparatus as an image processing apparatus according to the ninth embodiment of the present invention.

Referring to FIG. 25, an input unit 3101 inputs multi value image data having a predetermined number of bits per pixel, watermark information to be embedded, and parameters required for embedding. Of these inputs, the multi value image data is input to a wavelet transforming device 3102, and the watermark information to be embedded and parameters required for embedding are input to a digital-watermark embedding device 3103.

Note that the digital-watermark information to be embedded includes digital data such as ASCII character codes, image data, audio data, or the like. Furthermore, this embodiment can be applied to both digital-watermark information which is error correction encoded and digital-watermark information which is not.

The multi value image data input to the wavelet transforming device 3102 undergoes a predetermined transform. The operation of the wavelet transforming device 3102 will be described in detail later. The wavelet transforming device 3102 outputs frequency-transformed coefficients, which are sent to the digital-watermark embedding device 3103. The operation of the digital-watermark embedding device 3103 will be described in detail later.

The digital-watermark embedding device 3103 outputs synthesis image data embedded with the watermark information, and information required for extracting the watermark information from the synthesis image. The synthesis image data embedded with the digital-watermark information is input to an inverse wavelet transforming device 3104. The operation of the inverse wavelet transforming device 3104 will be described in detail later. The output from the inverse wavelet transforming device is input to an output unit 3105.

The information required for extracting the watermark information from the synthesis image output from the digital-watermark embedding device 3103 is input to the output unit 3105. In this embodiment, the information required for extracting the watermark information is generated from the synthesis image data but may be the same as the above-mentioned information required for embedding.

The output unit 3105 outputs the synthesis image data embedded with the watermark information, and information required for extracting the watermark information from the synthesis image.

The respective devices will be described in detail below.

The wavelet transforming device 3102 will be described first.

The wavelet transforming device 3102 divides input multi value image data (x) into a plurality of frequency bands (each band will be referred to a sub-band hereinafter) by the wavelet transform.

Figure 27:
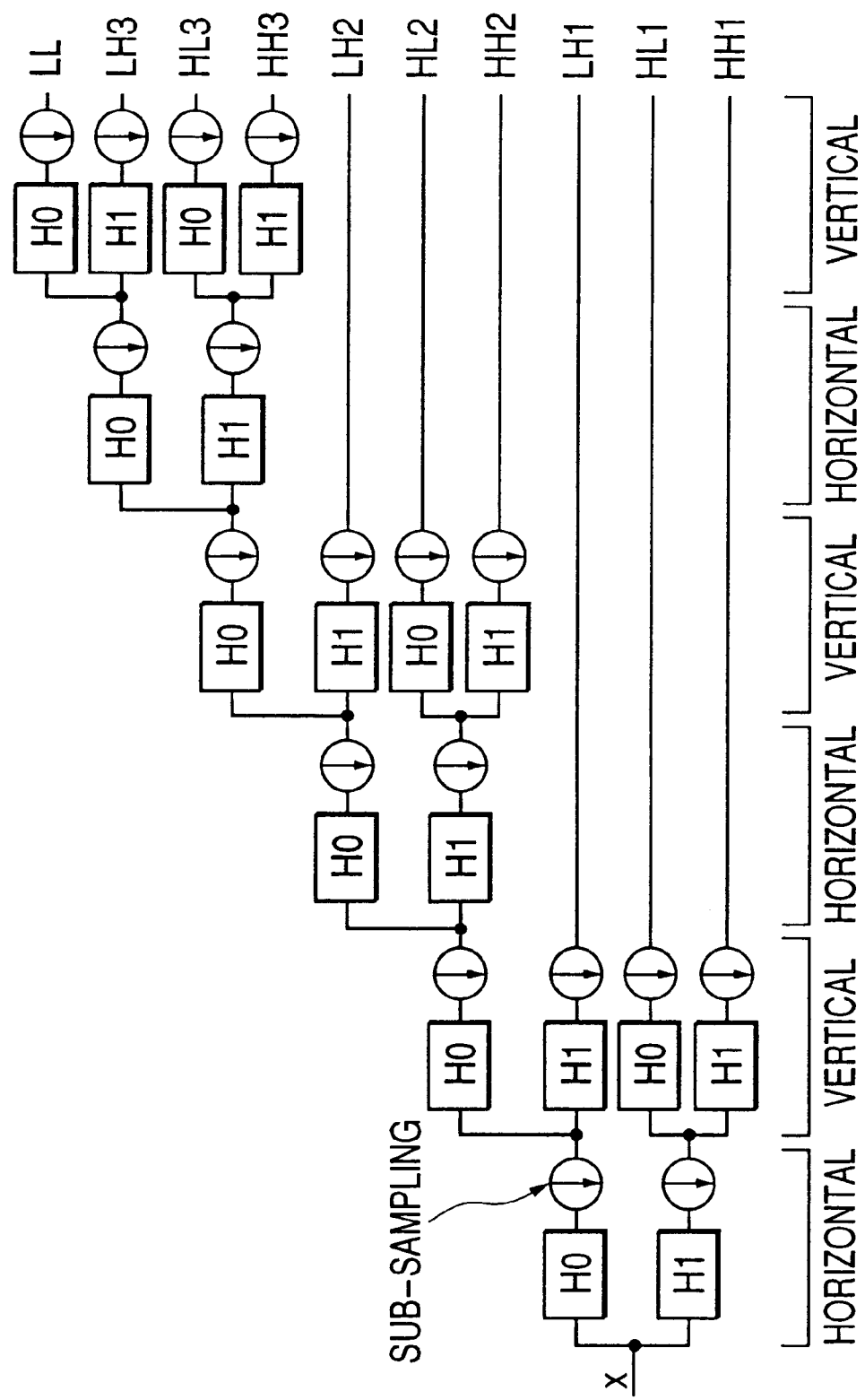
FIG. 27 is a circuit diagram showing the execution procedure of a wavelet transforming device.
Figure 28:
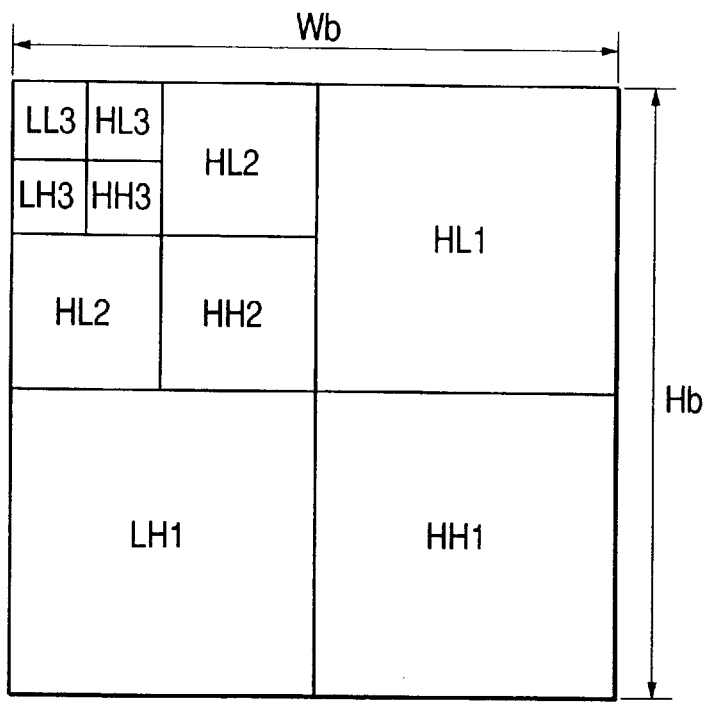
FIG. 28 is a view showing the concept of sub-bands generated by the wavelet transform.

FIG. 27 is a diagram for implementing the wavelet transform, and FIG. 28 shows the concept of sub-bands generated by this transform.

The multi value image data (x) input in FIG. 25 passes one or both of low-pass filters H0 and high-pass filters H1 in the horizontal and vertical directions, as shown in FIG. 27, and sub-sampled every time it passes through the filter. In this manner, the image data is divided into a plurality of frequency bands.

FIG. 28 shows the processing result of multi value image data having Wb pixels (horizontal)×Hb pixels (vertical) upon executing transforms in three steps shown in FIG. 27.

In this embodiment, the size of each block shown in FIG. 28 corresponds to the size (Wb×Hb) of an image divided by a block divider.

For example, a result r of filtering using the filters H0 and sub-sampling with respect to the multi value image data x is given by:

$$r(n)=<<[x(2n)+x(2n+1)]/2>> \quad (5)$$

and a result n of filtering using the filters H1 and sub-sampling is given by:

$$d(n)=x(2n+1)-x(2n+3)+<<[-r(n)+r(n+2)+2]/4>> \quad (6)$$

where $<<x>>$ is a maximum integer which does not exceed x.

The wavelet transforming device 3102 divides each input block image into a plurality of sub-bands by sequentially repeating filtering and sub-sampling in the horizontal and vertical directions, as shown in FIG. 27.

FIG. 28 shows the relationship between the names and spatial positions of sub-bands obtained by the processes shown in FIG. 27. As sub-bands, LL3 to HH1 ranging from low to high frequencies are obtained. Each sub-band includes a corresponding transform coefficient (frequency component).

The digital-watermark embedding device 3103 will be explained below.

Generally, a natural image such as a photograph has a huge number of large signals in a minimum area sub-band in the wavelet transform domain, and has only small signals in local portions such as edge portions, texture regions, and the like of an image in sub-bands other than the minimum area sub-band.

Furthermore, human vision is such that "it is hard for us to perceive a small change in a portion with a large change in the space domain".

By exploiting this fact, digital-watermark information is embedded in the wavelet transform domain.

This embedding process exploits the fact that "a portion with a large change in the space domain" corresponds to "a portion with a large absolute value of a coefficient in the wavelet transform domain".

More specifically, watermark information is embedded in coefficients having large absolute values of those included in sub-bands other than the minimum area sub-band in the wavelet transform domain. As a result, the digital-watermark information becomes hard to perceive by the human eye.

This embodiment pays attention to the tree structure in the wavelet transform domain, and embeds 1-bit information in each tree.

Figure 29:
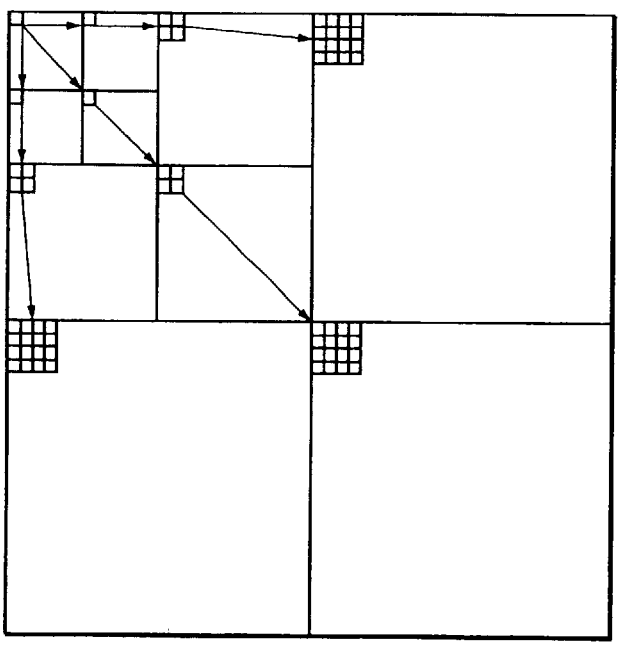
FIG. 29 is a view for explaining trees in the wavelet transform domain.

Note that the tree is a set of coefficients located at identical spatial positions in the wavelet transform domain. FIG. 29 shows an example of the tree structure in the wavelet transform domain.

FIG. 29 shows the tree structure having one wavelet coefficient which belongs to sub-band LL3 as a vertex.

Note that one wavelet coefficient which belongs to sub-band LL3 is called a parent, and four coefficients which belong to the same spatial position as that of the parent and belong to sub-bands on the immediately higher frequency side of sub-band LL3 are called children. Each child has four children of their own.

Of coefficients included in the tree except for a coefficient included in the minimum area sub-band, i.e., in LL3 in FIG. 28, a coefficient having the n_i-th largest absolute value is selected as an embedding object of the watermark information. Note that n_i is a natural number generated by, e.g., a random number generator. Also, i is the serial number assigned to the tree.

Note that n_i may change for every i using, e.g., a random number generator, or may assume an equal value in all the trees independently of i.

The selected coefficient may, for example, be embedded with watermark information by quantization. Note that quantization is to round a continuous value or discrete value to a discrete value or a discrete value with a different width. The rounded discrete value is called a quantizing representative value, and the width, i.e., the interval between neighboring quantizing representative values is called a quantizing step. The quantizing step size at that time corresponds to the embedding strength of watermark information. That is, when the quantizing step size is increased, the embedding strength of watermark information becomes higher; when the quantizing step size is decreased, the embedding strength of watermark information becomes lower.

Also, the quantizing step size corresponds to the degree of image quality deterioration of the synthesis image embedded with watermark information from its original image. More specifically, when the quantizing step size is increased, the degree of image quality deterioration of the synthesis image embedded with watermark information from the original image becomes higher; when the quantizing step size is decreased, the degree of image quality deterioration of the synthesis image embedded with watermark information from the original image becomes lower.

As can be seen from the above description, the quantizing step is a parameter that determines the tradeoff between the image quality of the synthesis image embedded with watermark information, and the robustness of watermark information to attacks.

This embodiment improves the tradeoff between the image quality and the robustness against attacks using the following method. That is, the largest possible quantizing step is used to improve the robustness against attacks, while control is made to minimize deterioration of the image quality.

As such quantization, nonuniform quantization is done.

The nonuniform quantization adaptively changes the quantizing step size in correspondence with the coefficient value to be quantized. "Adaptively" means to quantize a wavelet coefficient having a large absolute value of those to be quantized using a large quantizing step, and to quantize a coefficient having a small absolute value using a small quantizing step. However, the present invention is not limited to such specific method, but can be applied in correspondence with various situations as long as digital-watermark information is embedded with the first strength in a coefficient having a value falling within the first range, and digital-watermark information is embedded with the second strength in a coefficient having a value falling within the second range.

As described above, by adaptively changing the quantizing step in correspondence with the absolute value of the coefficient to be quantized, watermark information can be effectively embedded using some specific property of human vision. That is, the technique exploits the fact that human vision is relatively insensitive to high-frequency components but is relatively sensitive to low-frequency components of changes in an image.

The high-frequency components correspond to wavelet coefficients with large absolute values, and the low-frequency components correspond to wavelet coefficients with small absolute values. With these operations, watermark information can be embedded to have higher robustness while minimizing deterioration of the image quality of an original image.

As an example of a nonuniform quantizing table, a table that increases the quantizing step size in correspondence with the absolute values of coefficients to be quantized may be used. For example, tables that change the quantizing step size in accordance with a linear function, exponential function, and step function with respect to the coefficients to be quantized may be used.

Figure 33:
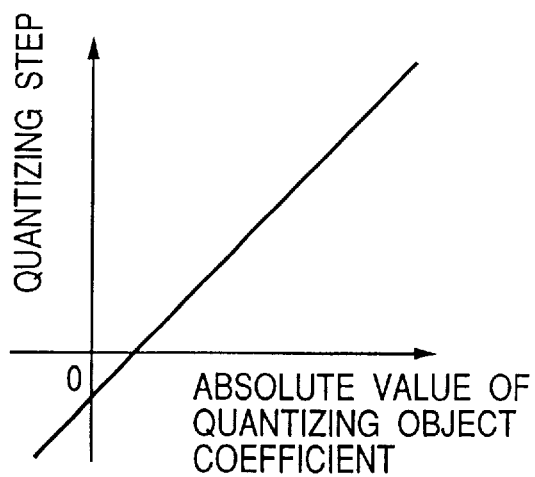
FIG. 33 is a graph for explaining nonuniform quantization using a proportional function.
Figure 34:
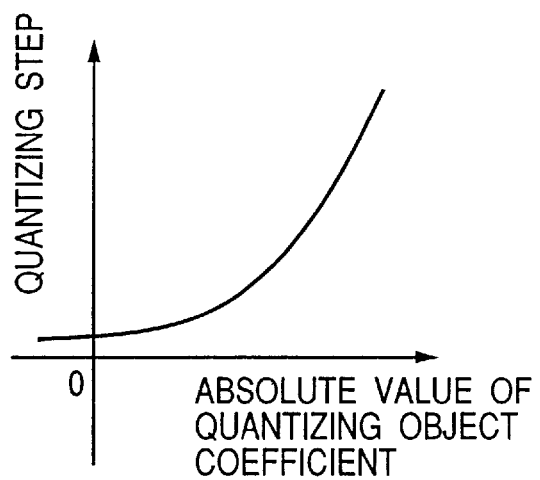
FIG. 34 is a graph for explaining nonuniform quantization using an exponential function.
Figure 35:
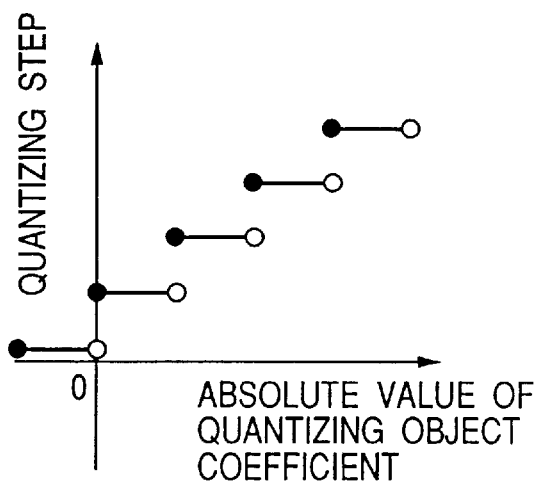
FIG. 35 is a graph for explaining nonuniform quantization using a step function.

FIGS. 33, 34, and 35 show examples of the quantizing tables respectively using linear, exponential, and step functions. These functions are preferably monotonously increasing ones when the abscissa plots the quantizing object coefficients and the ordinate plots the quantizing step. This is because a larger quantizing step can be used for a coefficient having a large absolute value of those to be quantized.

Figure 31:
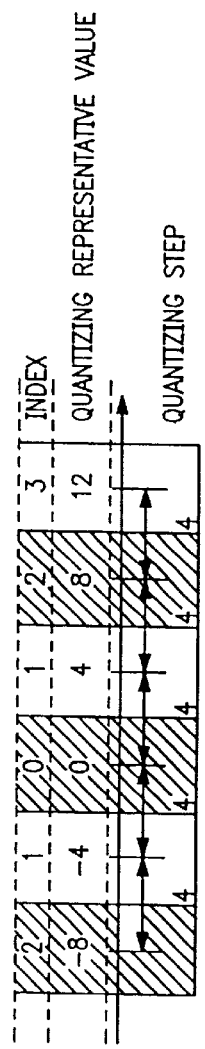
FIG. 31 is a view for explaining uniform quantization.
Figure 32:
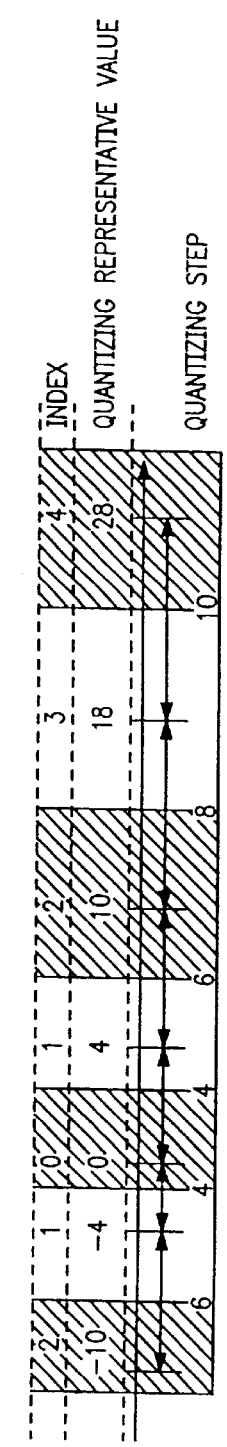
FIG. 32 is a view for explaining nonuniform quantization using a proportional function.

FIG. 31 shows a case of quantizing step=4 as a setup example of the conventional uniform quantizing step, and FIG. 32 shows a case wherein the absolute value of the quantizing object coefficient and quantizing index have a linear relationship therebetween as a setup example of the quantizing step in this embodiment.

Using the quantizing step selected by the aforementioned method, 1 bit "0" or "1" that constructs digital-watermark information is embedded according to, e.g., the following bit embedding rule.

When the digital-watermark information bit is "0", a quantizing object coefficient is quantized to a quantizing representative value of an even index closest to the coefficient.

When the digital-watermark information bit is "1", a quantizing object coefficient is quantized to a quantizing representative value of an odd index closest to the coefficient.

Note that the index is a serial number assigned to a quantizing period. Also, the quantizing period is a region which has the quantizing representative value as the center and has the size of the quantizing representative value.

The coefficient that has undergone the aforementioned processes is output from the digital-watermark embedding device 3103.

Further, digital-watermark embedding device 3103 outputs parameters relating to the quantizing step used when embedding and embedded position information of the watermark information.

The information of the embedded position of watermark information is calculated from coefficient data after the digital-watermark information has been embedded. Before embedding the digital-watermark information, a coefficient having the $n\_i$-th largest absolute value is selected as an embedding object. However, a coefficient obtained by executing the aforementioned embedding process in that coefficient by quantization does not have the $n\_i$-th largest absolute value. Hence, in order to specify the embedded position of the watermark information upon extracting it, information for specifying the embedded position of the watermark information on the basis of data after the digital-watermark information has been embedded is required.

As such information, the information that specifies the embedded position of the watermark information, i.e., information indicating that the coefficient embedded with the digital-watermark information has the $n'\_i$-th largest absolute value in the tree is used. These pieces of information are required for extracting the watermark information, and are input to the output unit 3105. Also, these pieces of information are different from information necessary for embedding, which is input to the input unit 3101 in FIG. 25. That is, information necessary for extraction is generated based on information embedded with the watermark information, and is different from that used in embedding.

The inverse wavelet transforming device 3104 will be explained below.

The inverse wavelet transforming device 3104 receives synthesis data of watermark information output from the digital-watermark embedding device 3103. The inverse wavelet transforming device 3104 calculates the inverse wavelet transform of the synthesis data of watermark information using the same base as the wavelet transforming device 3102. The data that has undergone the inverse wavelet transform is input to the output unit 3105 as synthesis image data of the watermark information.

FIG. 26 is a schematic block diagram of a digital-watermark information extracting apparatus as an image processing apparatus according to the embodiment of the present invention.

Referring to FIG. 26, data input from an input unit 3201 include image data embedded with watermark information using the digital-watermark embedding apparatus shown in FIG. 25, and information required for extracting the watermark information. Of these data, the image data embedded with watermark information is input to a wavelet transforming device 3202, and the information required for extracting watermark information is input to a digital-watermark extracting device 3203.

The image data embedded with watermark information input to the wavelet transforming device 3202 undergoes a predetermined transform. The process done by the wavelet transforming device 3202 must be equal to that of the wavelet transforming device 3102 shown in FIG. 25.

The wavelet transforming device 3202 outputs frequency-transformed coefficients, which are sent to a digital-watermark extracting device 3203. The digital-watermark extracting device 3203 extracts the watermark information from the data output from the wavelet transforming device 3202 using the information necessary for extracting the watermark information.

From the data output from the wavelet transforming device 3202, a coefficient in which the watermark information is embedded is specified. Upon specifying the coefficient, the input from the input unit 3201, i.e., the information necessary for extracting watermark information is used. The information necessary for extracting watermark information indicates that watermark information is embedded in data having the $n'\_i$-th largest absolute value in the tree in case of data in which watermark information is embedded by the image processing apparatus shown in, e.g., FIG. 25, i.e., a sequence $n'\_i$. With this information, the coefficient in which watermark information is embedded can be specified.

After the coefficient in which the watermark information is embedded can be specified, the watermark information is discriminated from this coefficient. The watermark information is discriminated using a quantizing index calculated by quantization. The quantizing index can be calculated using the coefficient in which the watermark information is embedded, and a table or the like that stores a correspondence between the coefficient and index. As such table, an identical one must be shared by both the digital-watermark embedding and extracting devices.

Note that the quantizing step is adaptively determined in correspondence with the coefficient in which the watermark information is embedded. That is, the coefficient in which the watermark information is embedded is specified, the corresponding quantizing step is calculated from the absolute value of the specified coefficient, and the quantizing index can then be calculated.

Using the obtained quantizing index, the digital-watermark information bit is discriminated using the following rule.

When the quantizing index is an even number, the digital-watermark information bit is "0".

When the quantizing index is an odd number, the digital-watermark information bit is "1".

This bit discrimination rule must be equal to the bit embedding rule in the digital-watermark embedding device 3103.

When the aforementioned process is repeated for all trees, all pieces of digital-watermark information can be extracted.

In this embodiment, the processes are done in the wavelet transform domain. Also, the present invention can be applied to the space domain, e.g., the luminance value or the like of a pixel. For example, when the luminance value is equal to or higher than a threshold value, these coefficients are selected as digital-watermark information embedding object coefficients. When the luminance value is equal to or higher than a threshold value, human vision is insensitive to such small change. Hence, even when this embodiment is applied to the space domain, information that is hard for the human eye to discern can be embedded.

In this embodiment, since the watermark information is embedded in a coefficient having the n__i-th largest absolute value, information indicating the n'__i-th largest absolute value position must be used as information for specifying the embedded position of watermark information, after the watermark information is embedded. That is, the information used to embed watermark information is different from that used in its extraction. However, when the embedded position is specified by a spatial position, i.e., a coordinate value or the like, information for specifying the embedded position need not be different before and after the watermark information is embedded.

Furthermore, in this embodiment, watermark information is embedded in wavelet transform coefficients but may be embedded in DCT coefficients or amplitude spectrum after the Fourier transform.

(10th Embodiment)

The 10th embodiment of the present invention will be described below.

This embodiment improves the above embodiment to be able to embed a larger number of bits.

The difference between this embodiment and the ninth embodiment lies in the number of coefficients selected as embedding object coefficients in each tree in the wavelet transform domain. The difference will be explained in detail below.

In the ninth embodiment, one coefficient in each tree is selected in the wavelet transform domain, and is quantized to embed a digital-watermark. By contrast, in this embodiment, a plurality of coefficients are selected from each tree to embed digital-watermark information.

More specifically, the reference absolute value is determined in advance up to the m__i-th largest one, and coefficients are sequentially selected in a tree in descending order of absolute value on the basis of this reference value. Note that m__i and i are natural numbers, and i is an index assigned to a tree. Note that m__i may change for every i or may be fixed independently of i. When m__i changes for every i, the number of bits to be embedded changes in units of trees; when m__i is fixed independently of i, the numbers of bits to be embedded in all the trees are equal.

When a plurality of bits are to be embedded, coefficients are selected in descending order of absolute value in place of random selection, thereby suppressing visual deterioration of the image quality from an original image. In this case, by increasing m__i, many bits can be embedded. However, when m__i is increased, the image quality deteriorates more.

This embodiment is effective for the purpose of improving the robustness against attacks and the purpose of increasing the number of pieces or kinds of digital-watermark information, since many bits can be embedded.

For the former purpose, the encoding ratio by error correction codes is reduced while the information volume of watermark information (embedding information in FIG. 25) input by this embodiment remains the same, thus increasing the correction performance upon detecting errors in watermark information. As an error correction code, majority discrimination codes, block codes such as BCH codes, Reed-Solomon codes, and the like, and convolution codes (Hideki Imai, "Coding Theory", the Institute of Electronics, Information and Communication Engineers) may be used.

For the latter purpose, the information volume of watermark information (embedding information in FIG. 25) input by this embodiment can be increased while the encoding ratio by error correction codes remains the same.

Figure 30:
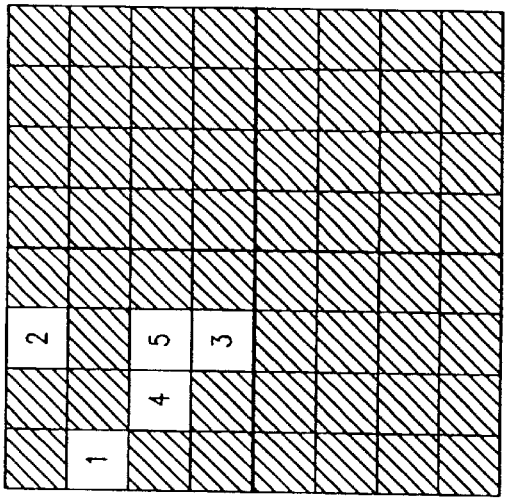
FIG. 30 is a view for explaining an embedding process of a plurality of bits in a wavelet tree according to the 10th embodiment.

FIG. 30 shows an example of wavelet coefficients selected as embedding objects of digital-watermark information when m__i=5. This example collects a set of coefficients (wavelet tree) associated using arrows in FIG. 29.

The values in rectangles in FIG. 30 indicate descending order of the absolute values of wavelet coefficients. That is, digital-watermark information is embedded according to this order. Note that coefficients having large absolute values are distributed in a relatively lower frequency range (the upper left side in the tree structure in FIG. 30) in a normal natural image signal, as shown in FIG. 30.

Using the aforementioned embedding method, a large number of pieces of digital-watermark information can be embedded in an image while suppressing visible deterioration of the image quality from an original image. Also, the robustness of this digital-watermark information to attacks can be improved.

This embodiment is applied to the trees of wavelet transform coefficients, but may be applied to blocks of DCT coefficients or those of the Fourier transform.

(11th Embodiment)

A memory medium according to the 11th embodiment of the present invention will be described below.

The present invention is not limited to the apparatus and method for implementing the embodiment shown in FIGS. 25 and 26, and a method implemented by combining the methods described in the embodiment. The scope of the present invention also includes a case wherein the embodiments are implemented by supplying a memory medium, which records a program code of software that can implement the functions of the above-mentioned embodiments to a computer (CPU or MPU) of a system or apparatus, and reading out and executing the program code stored in the storage medium by the computer of the system or apparatus.

In this case, the program code itself of software read implements the functions of the above-mentioned embodiments, and the program code itself and means for supplying the program code to the computer, i.e., a memory medium which stores the program code constitutes the present invention.

As the memory medium for supplying the program code, for example, a floppy disk, hard disk, optical disk, magnetooptical disk, CD-ROM, magnetic tape, nonvolatile memory card, ROM, and the like may be used.

Also, the program code is included in the scope of the present invention when the functions of the above-mentioned embodiments are implemented not only by controlling various devices according to the supplied program code alone but also by the program code in cooperation with an OS (operating system) or another application software, which is running on the computer.

Furthermore, the scope of the present invention includes a case wherein the above embodiments are implemented by some or all actual processes executed by a CPU or the like of a function extension board or a function extension unit, which is inserted in or connected to the computer, after the program code read out from the memory medium is stored in a memory of the function extension board or unit.

According to the aforementioned embodiments, when digital-watermark information is embedded in an image in secrecy, a high-quality image embedded with digital-watermark information which is highly robust against attacks and is free from any deterioration of the image quality of the synthesis image can be realized.

Also, the digital-watermark information can be easily extracted from the image embedded with the digital-watermark information.

Various modifications of the present invention may be made within the scope of the appended claims.

What is claimed is:

1. A data processing apparatus comprising:
   input means for inputting image data composed of a plurality of coefficients, from which a plurality of subsets are formed, coefficients of each subset representing a same image area;
   specifying means for specifying a group of coefficients whose values are within a predetermined range from the plurality of coefficients; and
   embedding means for embedding digital-watermark information to at least one coefficient selected at random from the coefficient group specified by said specifying means,
   wherein the random selection is executed in subset units, and
   wherein said embedding means error correction encodes the digital-watermark information, and embeds the obtained digital-watermark information thereafter.

2. An apparatus according to claim 1, wherein the plurality of coefficients correspond to a plurality of frequency components obtained by wavelet-transforming predetermined image data.

3. An apparatus according to claim 2, wherein said embedding means embeds the digital-watermark information in a random coefficient other than a lowest frequency component included in the coefficient group.

4. An apparatus according to claim 1, wherein said embedding means embeds the digital-watermark information in a random coefficient having a large absolute value.

5. An apparatus according to claim 1, further comprising:
   output means for outputting information for specifying the coefficient to which the digital-watermark information is embedded, together with the image data which has undergone embedding by said embedding means.

6. An apparatus according to claim 1, further comprising:
   output means for outputting interpolation data for reconstructing image data before embedding, together with the image data to which embedding is executed by said embedding means.

7. A data processing method comprising the steps of:
   inputting image data composed of a plurality of coefficients, from which a plurality of subsets are formed, coefficients of each subset representing a same image area;
   specifying a group of coefficients whose values are within a predetermined range from the plurality of coefficients; and
   embedding digital-watermark information to a coefficient selected at random from the coefficient group specified by said specifying step,
   wherein the random selection is executed in subset units, and
   wherein said embedding step error correction encodes the digital-watermark information, and embeds the obtained digital-watermark information thereafter.

8. A memory medium storing computer-executable code to perform a data processing method, said code comprising:
   code for inputting image data composed of a plurality of coefficients, from which a plurality of subsets are formed, coefficients of each subset representing a same image area;
   code for specifying a group of coefficients whose values are within a predetermined range from the plurality of coefficients; and
   code for embedding digital-watermark information to a coefficient selected at random from the coefficient group specified by said specifying code,
   wherein the random selection is executed in subset units, and
   wherein said code for embedding error correction encodes the digital-watermark information, and embeds the obtained digital-watermark information thereafter.

* * * * *